United States Patent [19]

Baker

[11] Patent Number: 4,627,118

[45] Date of Patent: Dec. 9, 1986

[54] VACUUM FILTER FOR SWIMMING POOLS CONTROLLING WATER RECIRCULATION CAPACITY TO ACCOMMODATE VARYING GUTTER FLOW

[76] Inventor: William H. Baker, 50 Fairway Ridge, Clover, S.C. 29710

[21] Appl. No.: 607,338

[22] Filed: May 4, 1984

[51] Int. Cl.⁴ .......................... E04H 3/18; E04H 7/00
[52] U.S. Cl. .......................................... 4/510; 4/507; 4/508; 4/509; 210/106; 210/416.1; 210/416.2
[58] Field of Search ................... 4/510, 512, 506, 507, 4/508, 509; 210/169.7, 85, 86, 90, 106, 416.1, 416.2, 278, 445, 448, 237, 238; 137/557, 558

[56] References Cited

U.S. PATENT DOCUMENTS

| | | | |
|---|---|---|---|
| 3,616,468 | 11/1971 | Takacs | 4/509 |
| 3,668,712 | 6/1972 | Baker | 4/510 |
| 3,668,714 | 6/1972 | Baker | 4/510 |
| 3,815,160 | 6/1974 | Baker | 4/510 |
| 4,050,104 | 9/1977 | Baker | 4/510 |
| 4,133,058 | 1/1979 | Baker | 4/510 X |
| 4,389,739 | 6/1983 | Baker | 4/510 X |
| 4,542,544 | 9/1985 | Baker | 4/510 |

Primary Examiner—Henry K. Artis

[57] ABSTRACT

A vacuum filter is provided for vacuum flow filtration through a filter bed of water from a swimming pool including flow from the pool and from the gutter of the swimming pool, and controlling water recirculation capacity to accommodate varying gutter flow, comprising a tank; a filter bed of particulate material in the tank; a first inlet line communicating the swimming pool with the tank for gravity flow into the tank and maintaining a predetermined level of water in the tank in relation to a level of water in the swimming pool, thereby providing a head of water for gravity backwash flow through the filter bed; a second inlet line communicating the tank with the perimeter gutter for the swimming pool for gravity flow into the tank; a third inlet line communicating the tank with the perimeter gutter for the swimming pool for suction flow into the tank; an outlet line communicating the tank with the water recirculation system; a pump drawing a vacuum downstream of the filter bed and recirculating filtered water to the swimming pool; valves controlling flow into the tank via the first, second and third inlet lines; and at least one water level-responsive sensor sensing and directly responding to the level of water in the tank and adjusting the valve controlling suction flow, to increase gutter drain flow to the tank sufficiently to prevent gutter water flooding back from the gutter to the pool.

48 Claims, 9 Drawing Figures

VACUUM FILTER FOR SWIMMING POOLS CONTROLLING WATER RECIRCULATION CAPACITY TO ACCOMMODATE VARYING GUTTER FLOW

Most swimming pools built today include a perimeter gutter and a water recirculation system taking water both from the gutter and directly from the pool, filtering it, and then recycling the filtered water to the pool. The water recirculation system when the pool is quiescent may draw a skimming flow off the top of the pool through one or a plurality of skimming weirs or skimming gutter, and also a bottom flow directly from the pool via the main drain. Both flows are combined, pumped through a filter bed, and then returned to the pool, if desired after the addition of bactericides such as halogen. When the pool is active, in addition to any skimming flow considerable amounts of water from the pool may also splash over into the gutter, and this water also is returned via the water recirculation system to the pool, after having passed through the filter.

The pump for recirculating the water through the filter bed and back to the pool is normally placed between the pool drain and/or gutter drain and the filter bed, so that dirty water is forced under pressure through the filter. This of course requires a filter tank built to withstand relative high internal fluid pressures, and as the filter bed becomes burdened with contaminants, the upstream fluid pressure can increase. The necessity of housing the filter bed in a pressure tank of course increases the cost of the filter system.

Cleaning of the filter bed is normally accomplished by a reverse flow or backwash flow of water through the bed, unloading the contaminants, and carrying them off with the backwash flow. For the purpose, backwash pumps, elevated storage tanks, or other devices have been required, to supply the backwash water, and cause it to flow through the bed in the reverse direction.

Filter systems in which the water is drawn through the bed by a slight vacuum drawn on the downstream side of the bed, by placing the water recirculation pump downstream of the filter rather than upstream, have been known for a long time, but in recent years have not been widely used. Mitchell U.S. Pat. No. 883,467 dated Mar. 31, 1908 shows such a system. Similar systems are shown in U.S. Pat. Nos. 3,061,100 to Fehlmann dated Oct. 30, 1982 and 3,616,468 to Takacs dated Nov. 2, 1971. In both Mitchell and Takacs the water travels through the bed by gravity, and is drawn out through the pump, whence it is pumped back to the pool. Fehlmann shows a similar system, and in addition the pump is reversible, and can reverse the flow of water through the bed, so as to unload the contaminants by backwashing.

While the principles of construction of a filter tank for use with swimming pools have been appreciated for a considerable time, it has not been easy to design a filter that does not pose problems in use. Swimming pool water can be highly corrosive, and unless the surfaces of the equipment contacting it are corrosion-resistant, or coated so as to prevent corrosion, the life of the component can be rather short. This is particularly true of filter tanks, which are normally made of metal. While stainless steel can be used, it is rather expensive, and to minimize costs the choice is normally a coated metal material, but coatings can wear, or flake, or chip, so that the metal surface must be susceptible of being inspected from time to time, to make sure that it is properly protected. It is also necessary of course to change the filter bed from time to time, and to service component parts such as valves, and this requires ease of access.

It is desirable that the filter be relatively simple to operate, with a minimum of wearable parts and parts that can go out of order, so as to avoid the need for taking the filter out of service for inspection and repair. Nowadays, it is also necessary that the filtered water be of the very highest standard, since the sanitary and health codes laid down by the governmental authorities are becoming more and more stringent, and ever more difficult to meet.

U.S. Pat. No. 4,127,485, patented Nov. 28, 1978, to Baker and Wall, provides a vacuum filter for vacuum flow filtration through a filter bed of water from a swimming pool comprising an open-top tank; a filter bed of particulate material in the tank; fluid flow connections communicating the tank with a water recirculation system for the swimming pool, one adjacent an upper portion and one adjacent a lower portion of the filter bed; an inlet line communicating the swimming pool with the tank and maintaining the level of water in the tank at a level corresponding to a level of water in the swimming pool, thereby providing a head of water for gravity backwash flow through the filter bed, and valves controlling flow into the tank via the fluid flow connections, between the tank and the inlet line, and between the tank and the water recirculation system; and a direct fluid flow connection communicating a gutter drain of the swimming pool with the tank; a vacuum is drawn downstream of the filter bed by a pump recirculating filtered water to the swimming pool.

A feature of the invention is the separate entry into the filter chamber or compartment of the tank of both main drain flow from the swimming pool and gutter flow from the perimeter gutter system of the swimming pool. A water level in the filter compartment is maintained via the main drain flow by virtue of the pressure head in the swimming pool, for the purpose of gravity backwash flow. This pressure head can be provided either by feeding main drain flow into an antechamber before the filter compartment of the tank, or by feeding main drain flow directly into the filter compartment of the tank, as shown in the embodiments of the invention illustrated in the drawings.

This head of pressure also makes possible regulation of the proportionate volume of flow entering the filter chamber from the main drain and from the gutter. In effect, increasing gutter flow throttles back main drain flow from the swimming pool, in proportion to the increase in gutter flow.

This is because flow from the gutter into the filter compartment increases the water level in the filter compartment above the normal water level maintained under the pressure head from the swimming pool via the main drain. An increase in level in the filter compartment has a throttling effect on flow through the main drain into the compartment, slowing down main drain flow, since such flow now encounters the increased pressure head in the filter compartment. As gutter flow increases, so does the pressure head in the compartment, and the throttling of the main drain flow also increases in proportion.

This throttling effect is intended to ensure that there will be a sufficient capacity reserved in the water recirculation system upstream of the vacuum filter to accommodate any increased gutter flow that may be encountered, so as to prevent flooding of the gutters. The vacuum filter provides such accommodation to increased gutter flow by throttling back main drain flow, in proportion to pressure head in the filter compartment. However, this accommodation is inadequate in some cases.

Modern swimming pools have automated surge weir and rim skimming gutter flow control systems which give automatic controll at all times of the water level in the pool. Such control however requires prompt response to changes in operating conditions, and is not easy to achieve. Many attempts have been made, but a fully satisfactory automated response to all use conditions has not in fact been obtained.

Establishment and maintenance of the water level in a pool when the pool is quiescent is relatively easy. One system for automatically maintaining pool level, sensing pool level by a float in a surge and level control tank, and feeding make-up water to the pool by a float-operated valve, is described in U.S. Pat. No. 3,386,107 to G. R. Whitten Jr., patented June 4, 1968. It is desirable of course to avoid placing a float directly in the pool, since not only would a float be in the way of swimmers, but the float would also be subject to changes in water level due to wave action. These problems are avoided by placing the float in a separate surge and level control tank, connected to the pool below the surface, so that the control responds only to static pool level. When the static level is below a predetermined level, make-up water is added even though the pool surface may be turbulent. In the system of this patent, the make-up water is added to the control chamber in the tank, in which the float sinks to detect a low water level, and excess water is also withdrawn by overflow or drain provided through the control tank. However, as noted by Whitten, Jr., in a later U.S. Pat. No. 3,537,111 patented Nov. 3, 1970, the cost of such an elaborate surge and level control tank adds substantially to the total construction cost of the pool.

A further system noted by Whitten Jr. in U.S. Pat. No. 3,537,111 is to provide a sump separated from the pool by a ledge which sets a level for overflow, and a make-up water supply valve feeding directly into the sump under the control of a float. A drain valve is connected to the same float for draining the sump to a recirculating pump whenever the sump tends to overfill. However, this system does not correct flooding of the sump to the pool level by rain or overfilling, and no peripheral gutter is provided in this system, which also requires the construction of a separate sump tank which has to be placed at pool-side, rather than located remotely at a location which would be both more convenient and less obstructive of the deck around the pool.

Accordingly, in U.S. Pat. No. 3,537,111, patented Nov. 3, 1970, Whitten Jr. proposed a modified system in which all water level sensors sense water level in the drainage gutter, and not in the pool. The level of drainage flow in the single peripheral gutter is detected at one level or a range of levels. The gutter has an overflow lip or weir for skimming flow at the desired pool height, and delivers overflow to a recirculating pump and filter, which may also draw water from drains under the pool surface. The detecting means controls a valve in a make-up water supply line which either feeds the pool directly, or feeds the recirculating pump, if prefiltration is desired. The control is arranged to open the make-up valve, if the drainage flow falls below a level that will guarantee maintenance of continuous overflow all around the periphery of the pool, taking the provision of a hydraulic gradient in the gutter into account. If the drainage flow rises beyond a normal operating level, which is sufficiently lower than the gutter lip to allow ample space in the gutter to receive abnormal flow caused by pool surge, the control closes the make-up valve and discontinues the supply to the pool.

Means is also provided for increasing the rate of drainage of the gutter under flooding conditions, detecting the level of the drainage flow to control the main drain valve. The control is arranged to partially close the main drain valve to reduce the proportion of the recirculating flow which is drawn from the main drain whenever the gutter flow substantially fills the gutter space reserved for surge and approaches the level of the overflow drain pipe. The effect of this is to increase the rate of flow taken by the recirculating pump from the gutter, and thus hasten a drop in the drainage overflow in the gutter to a suitable operating level. As this level returns to normal, the control reopens the main drain valve to restore the original proportioning of the recirculating flow taken from the gutter and the pool.

The system does however have an inadequate gutter capacity to respond to high gutter flooding conditions.

Higher than normal pool levels, substantially higher than the overflow lip of the gutter, must be prevented from entering the gutter, therefore, by covering the gutter with a grille having drain holes whose total area is calculated to admit only the maximum recirculation flow rate that can be handled by the gutter. Such water is retained on the grille, and accordingly washes back to the pool without entering the gutter, which is undesirable, since this washes dirt and debris collected on the grille back into the pool, and accordingly fails to meet modern health code requirements.

In order to prevent this, it is necessary to provide a gutter system of considerably increased capacity, such as a double gutter of the type provided, for example, by U.S. Pat. Nos. 3,668,712, 3,668,713, 3,668,714 and 3,815,160 to Baker. However, the control system of U.S. Pat. No. 3,537,111 is not suitable for use in a double gutter pool.

In a single channel gutter, the flow capacity of the gutter is a function of the cross-section of the gutter and the hydraulic gradient which can be established over the length of the gutter to the point of discharge from the gutter system. The shortcoming is that the gutter loading around the pool is never uniform, which results in point flooding, which destroys the hydraulic gradient, and which causes backup and stagnation of the water in the gutter at the far end of the pool.

In order to alleviate this problem U.S. Pat. No. 3,668,714 to Baker provides a double channel gutter system designed to provide immediate transfer from the upper gutter to lower gutter. This design eliminates point flooding in the upper gutter, and permits a hydraulic gradient to be established in the lower gutter, which ensures delivery of a constant rate of flow from the gutter system.

U.S. Pat. No. 4,133,058 to William H. Baker, patented Jan. 9, 1979 provides a fully automated pool level and skimming gutter flow control system for swimming pools, automatically establishing and controlling pool levels and skimming gutter flow under both normal and extraordinary pool use conditions, sensing changes in water level and water activity, and actuating appropriate response mechanisms controlling water feed and skimming gutter drain flow, as well as make-up water and rate of recirculation of the water between the pool and the filtration system. The system comprises a gutter receiving overflow, including surge flow and/or skimming flow, across the top of the perimeter gutter and adequate for normal and surge flow conditions, and optionally, a second gutter receiving skimming flow and also providing additional gutter capacity for extraordinary overflow, including relief flow from the first gutter in the event of considerable activity in the pool, in combination with a level-sensing pool and overflow control system operating from the level of water in the pool and from the level of water in the pool overflow, such as in the gutter conduit, or in a balance tank or a vacuum filter tank, to control the skimming flow and water recirculation between the pool and the gutter, and feed from a water-make-up supply.

U.S. Pat. No. 4,133,058 to William H. Baker patented Jan. 9, 1979, provides a fully automated surge weir and rim skimming gutter flow control system for swimming pools, automatically establishing and controlling surge weir and rim skimming gutter flow under both normal and extraordinary pool use conditions, sensing change in water level and water activity, and actuating appropriate response mechanisms controlling surge weir and rim skimming gutter flow and/or rate of recirculation of the water between the pool and the filtration system, with switches to convert the gutter from weir to rim skimming and back.

U.S. Pat. No. 4,206,522 to William H. Baker, patented June 10, 1980, provides an automated skimming flow perimeter gutter control system for swimming pools having a water cleaning and recirculation system receiving water from the pool, cleaning it, and returning it to the pool; a first drain line connecting the pool to the water recirculation system for water feed from the pool for cleaning; a gutter conduit for disposition about the perimeter of a swimming pool, receiving overflow across a top edge thereof and adapted to carry water at a level below a predetermined level in the swimming pool; a second drain line connecting the gutter conduit with the water recirculation system for water feed from the gutter for cleaning; skimming means receiving skimming flow across a top edge thereof at the perimeter of the swimming pool; a first drain valve in the first drain line which when open allows water from the pool to flow to the water recirculation system, and when closed stops such flow; a balance means in flow connection with the first and second drain lines and the water recirculation system, receiving pool water via each drain line, blending the pool waters, and flowing the blended waters to the water recirculation system; and at least one water level-responsive sensor sensing and directly responding to the level of water in the balance means and adjusting the water recirculation flow from the pool and from the gutter to increase water recirculation system capacity for flow from the gutter and prevent gutter water flooding back from the gutter to the pool.

A further improvement to the double channel system became necessary in large pools where the activity can be such that even the double channel system cannot keep up with the heavy in flow of water from the pool to the gutter system without flooding. Patterson accordingly added a suction tube in the gutter, so that direct pump suction could be applied to drain the gutter.

U.S. Pat. No. 4,121,307 to James A. Patterson, patented Oct. 24, 1978, provides a perimeter gutter system for a swimming pool including an open gutter around its perimeter including a backwall, a bottom and an inner wall, and a suction pipe extending around the perimeter of the pool at the bottom of the gutter connected to the suction side of a pump for positive withdrawal of water from the gutter.

U.S. Pat. Nos. 4,112,526 to James A. Patterson, patented Sept. 12, 1978, and 4,173,799 to James A. Patterson patented Nov. 13, 1979, provide a perimeter gutter system for swimming pools comprising a gutter formed in part by an inner lip. Openings spaced around the perimeter of the pool are formed in the inner lip, and means are provided to close the openings when the water level in the gutter reaches a predetermined level. Optionally, a conduit is located below the gutter and is connected to the suction side of a pump. Selectively closeable holes in a wall common to the gutter and conduit form a communication between the conduit and gutter.

In all three of these Patterson gutter designs, the gutter drain has a constant flow rate for feed back to the water recirculation system. Once gutter level is established by a certain flow into the gutter, from overflow through the skimmers or over the peripheral pool retaining wall, and a fixed suction rate via the drain to the pump of the recirculation system, any increase in flow into the gutter increases the gutter level. As activity in the pool increases, therefore, flooding of the gutter is inevitable at some high pool activity level, and at any level of activity above quiescence, the gutter level is always above the level at quiescence, reducing its capacity and increasing its tendency to flood as activity increases further.

U.S. Pat. No. 4,389,739 to Baker, patented June 28, 1983, accordingly provides a way to overcome this flooding problem by providing means for controlling water recirculation capacity to accommodate an increased gutter flow, and means for controlling suction flow from the gutter to the water recirculation system as pool activity increases, so as to be able to draw down gutter water level as pool activity increases to accommodate any above normal gutter flow that may be encountered.

As a further improvement in use of the suction tube in the Baker patent, suction removal from the gutter is regulated by a sensor, which either increases the pump capacity or by-pass water around the recirculating system, according to the water level sensed in the gutter. However, this system still is subject to flooding by heavy surges under certain usage conditions not truly indicative of pool activity or gutter flow, so that this system, while a definite improvement, is not the ideal solution to the problem.

The automated skimming flow perimeter gutter control system for swimming pools thus provided comprises, in combination, a water cleaning and recirculation system receiving water from the pool. cleaning it, and returning it to the pool; a gutter conduit for disposition about the perimeter of a swimming pool, receiving overflow across a top edge thereof and adapted to carry water at a level below a predetermined level in the swimming pool; a drain line connecting the gutter conduit with the water recirculation system; suction means in series flow connection with the gutter conduit and drain line for positive withdrawal under suction of water from the gutter conduit and of such water feed to the water recirculation system for return to the pool; at least one of (a) means for controlling water recirculation capacity to accommodate any selected flow of water from the gutter to the water recirculation system; and (b) means for controlling suction flow from the gutter to the water recirculation system; and at least one water level-responsive sensor sensing and directly responding to the level of water in the gutter conduit by adjusting at least one of the means controlling the water recirculation capacity to accommodate flow from the gutter and the means for controlling suction flow, to increase gutter drain flow sufficiently to prevent gutter water flooding back from the gutter to the pool.

The gutter water level in this system is determined by the total of the skimming and surge flow into the gutter and the gutter drain flow capacity, which in turn is a function of the withdrawal flow rate applied by the suction means, so that gutter water level is in effect a reflection of the stage of pool activity then in being.

Thus, the flow control system of this invention accommodates any increase in pool activity above the quiescent condition that results in a greater-than-normal skimming flow through the skimming weirs and/or over the rim into the gutter, and that in turn causes the pool water overflow level in the gutter to rise.

The means for controlling water recirculation capacity and the means for controlling suction flow can be the same or different. In some instances, such as at an early pool activity stage, if the water recirculation capacity is already adequate, all that is required to prevent gutter water flooding back from the gutter to the pool is an adjustment of the means for controlling suction flow. Thus, for example, the means for controlling suction flow to increase gutter flow can be a throttling valve in the line between the gutter and the water recirculation system, and this valve can normally be set at less than full suction flow capacity for that line. Then the suction flow can be increased merely by opening the valve further, and this can be done by way of a water-level responsive sensor.

The means for controlling water recirculation capacity can take the form of a throttling valve, which is set at a position that is less than fully open for normal recirculation flow, and then opened further to increase water recirculation flow, as required. This valve can also be controlled by one or more water-level responsive sensors, for one or more degrees of opening.

Water recirculation capacity can also be increased by opening a bypass line bypassing the filter, which also can be controlled by a shut-off valve responsive to a water-level responsive sensor. The pump in the water recirculation line can also be operable at varying speeds, and the speed of pumping increased or decreased, as controlled by one or several water-level responsive sensors to increase or decrease water recirculation capacity and/or suction flow as required.

Another way of increasing water recirculation capacity is to provide two gutter drain lines, one leading to the water recirculation system before the filter, and in normal use, and one for use only in times of high gutter flow, bypassing the filter and returning the gutter drain flow directly to the pool via the water feed line of the water recirculation system. The latter can have a sensor-controlled valve that is normally closed, but opened whenever gutter water level reaches a predetermined high level. Either or both gutter drain lines can be provided with a pump, to apply suction to withdraw suction gutter flow from the gutter, and recirculate it to the pool.

If the pool is provided with a pool drain line also feeding into the water recirculation system, this line can be provided with a throttling valve, and a water-level responsive sensor put in operating connection with this valve. When a selected gutter water level is reached, the water recirculation system capacity for gutter flow can be increased by throttling back or closing the pool drain valve, increasing the recirculation system capacity correspondingly for suction flow into the system from the gutter.

None of these expedients is fully satisfactory in all cases, however. By-pass of the filter means that unfiltered water is recirculated to the pool. Control of the main drain line via a valve according to a sensor located in the gutter is too indirect and sometimes too inflexible.

The present invention provides precise gutter control utilizing a vacuum filter with connected piping and positive suction means withdrawing water as required from the perimeter gutter via a suction line leading to the filter to accommodate increased activity in the pool and gutter system. The suction line which draws from the suction tube in the gutter has a capacity which is a function of the difference in elevation between the water in the pool gutter and the water level in the filter tank coupled with the diameter of the suction line leading into the filter.

The discharge end of the suction line opens into the filter compartment below the normal operating water level N in the filter compartment. This is the minimum level maintained during normal operation of the filter, and prevents air from entering the suction line.

Since the suction line is not and does not require establishment of a hydraulic gradient, the flow velocity (flow capacity) of water in the suction line is directly related to the diameter of the column of water within the suction line, and the difference in elevation between the respective water levels. The larger the column of water discharging into the filter, the greater the velocity of water being drawn through the suction line from the gutter, and of course, the greater the draw capacity of the system. The gutter water can be drawn instantly from the entire perimeter gutter of the pool without waiting for a hydraulic gradient to be established.

The necessary gutter flow control is provided by relocating the water-level responsive sensors from the gutter to the filter tank, either in the filter compartment or in an adjacent compartment upstream of the filter compartment, and by directing main drain flow, gravity gutter flow and suction gutter flow into that compartment, thus regulating the proportionate volumes of each such flow into the water recirculating system via the filter tank. In effect, increasing flow in one inlet line throttles back flow in the other inlet lines, in proportion to the increased flow. This gives more accurate automatic flow control, and it does so at the same time as the water-level responsive sensors sense changes in level in that compartment and adjust accordingly at least one valve controlling flow in at least one inlet line.

The vacuum filter in accordance with the invention comprises a tank; a filter bed of particulate material in the tank; a first inlet line communicating the swimming pool with the tank for gravity flow into the tank, and maintaining a predetermined level of water in the tank in relation to a level of water in the swimming pool, thereby providing a head of water for gravity backwash flow through the filter bed; a second inlet line communicating the tank with the perimeter gutter for the swimming pool for gravity flow into the tank; a third inlet line communicating the tank with the perimeter gutter for the swimming pool for suction flow into the tank; an outlet line communicating the tank with the water recirculation system; a pump drawing a vacuum downstream of the filter bed and recirculating filtered water to the swimming pool; optionally, valves controlling flow into the tank via the first, second and third inlet lines; and at least one water level-responsive sensor sensing and directly responding to the level of water in the tank and adjusting the valve controlling suction flow to increase gutter drain suction flow to the tank sufficiently to prevent gutter water flooding back from the gutter to the pool.

This vacuum filter is of an extremely simple design because it utilizes gravity flow for backwash flow of the water through the filter bed, and in fact is capable of backwash flow under the static head of pressure in the main drain from the pool or in the tank, which corresponds to the static head of pressure of the swimming pool, at least when the pool is filled to the normal level. Since the filtration is under atmospheric pressure, while a vacuum is drawn downstream of the filter bed by the water recirculation pump, it is not necessary to use a heavy closed pressure vessel for the filter tank. Since backwashing is by gravity flow, a uniform percolation of the water through the bed is ensured, making it possible to backwash the bed completely in all portions without the need for any external power source, such as backwash pumps, elevated storage tanks, or other devices. The water that is used is the water from the swimming pool, which can be replenished without difficulty in the normal way from the make-up supply.

Because the pressure downstream of the surface of the filter bed while the pump is withdrawing the flow downstream of the bed is below atmospheric, the water flows evenly through the bed in either direction, under laminar flow conditions, so that there is no possibility of shortcircuiting through the bed, with contaminant breakthrough. High differential pressure across the bed cannot build up, even when the bed is heavily loaded with contaminants. Contamination of the effluent water due to breakthrough the bed is eliminated, because of the low differential pressure. True flow streamlines are formed within the bed, giving a contact/adsorption system, ensuring complete removal of suspended particles from the incoming water. Since no parts of the system are under any pressure greater than atmospheric, the system is simple, safe and reliable. Moreover, exposure of the water after filtration to a pressure below atmospheric allows gases normally dissolved in the water to escape from solution. These collect below the filter bed, but the discharge of the collected gases can easily be accomplished by stopping the flow through the bed from time to time, thus permitting the gases to percolate upwardly in reverse flow direction through the bed without encountering a counterflow of water, and to escape into the atmosphere from the surface of the water. Since the filter can be contained within an open tank, there is easy and complete access to any component part at all times.

Preferred embodiments of the vacuum filter in accordance with the invention are shown in the drawings, in which.

Figure 1:
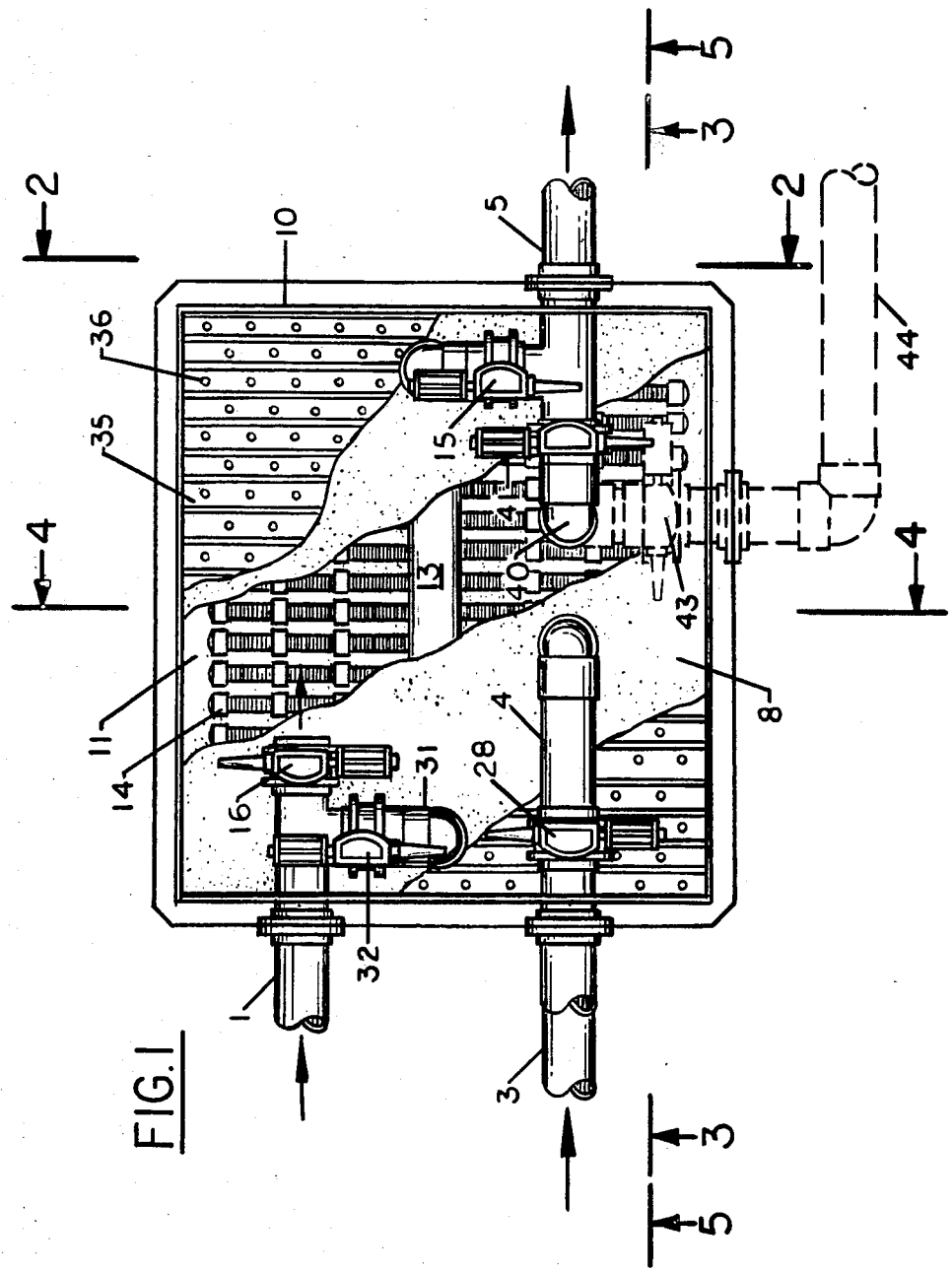
FIG. 1 represents a top or plan view of one embodiment of the vacuum filter.
Figure 2:
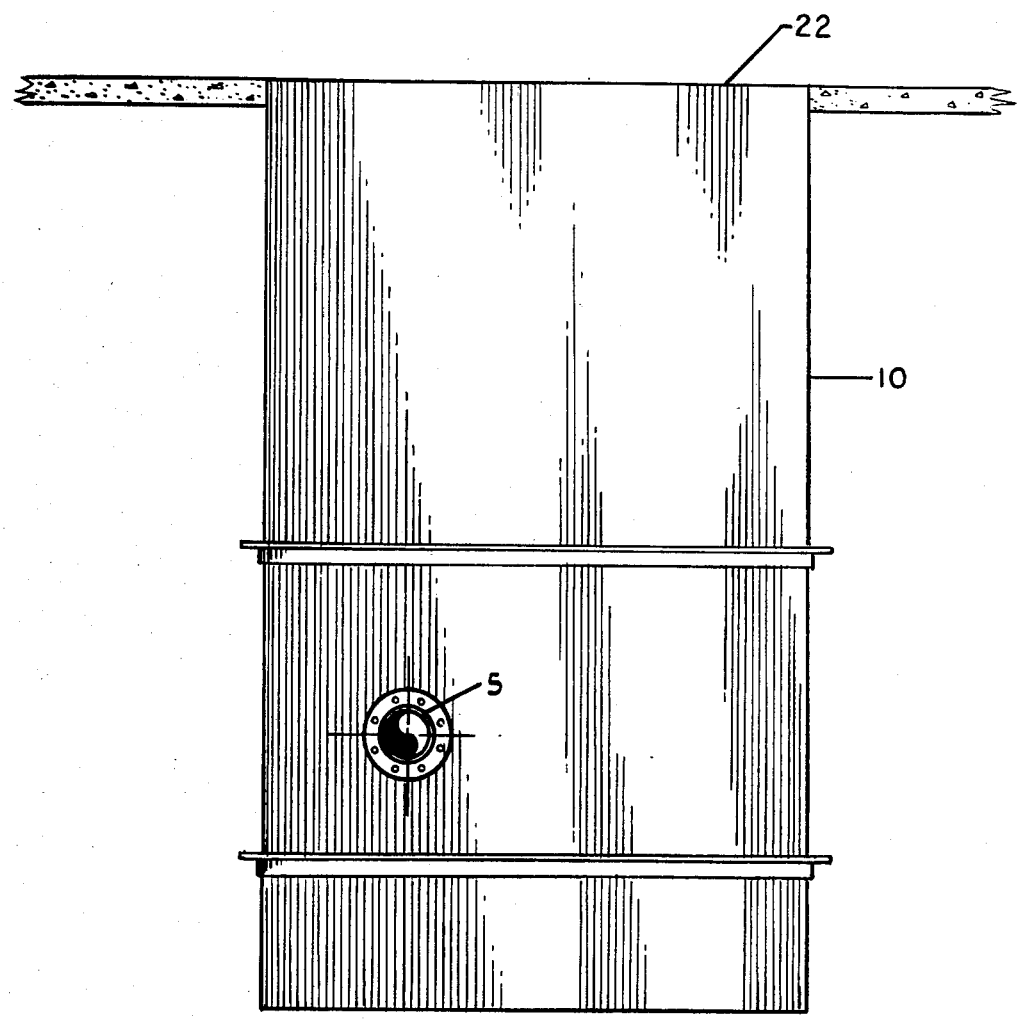
FIG. 2 represents an end view of the vacuum filter of FIG. 1.
Figure 3:
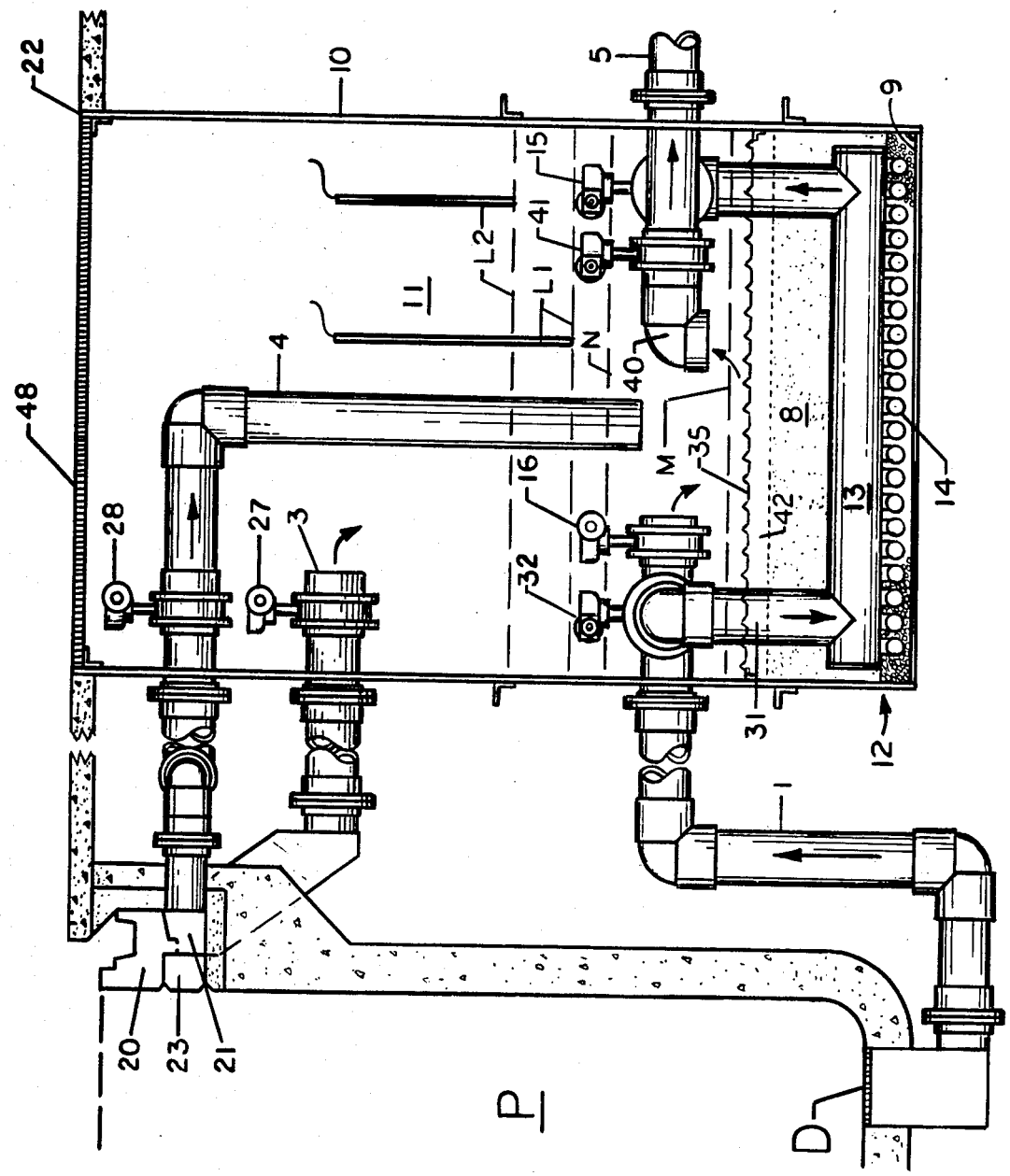
Figure 4:
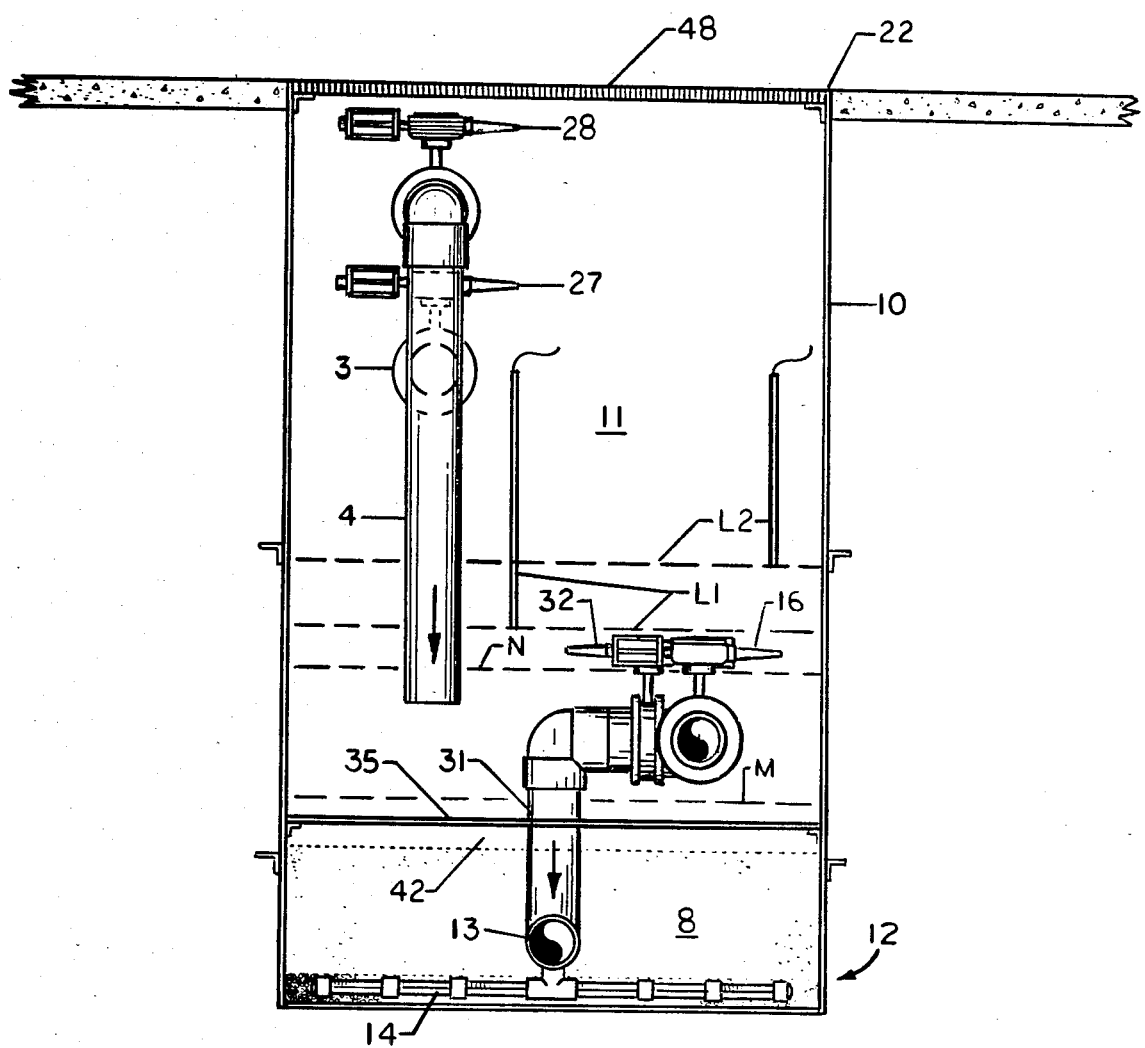
Figure 5:
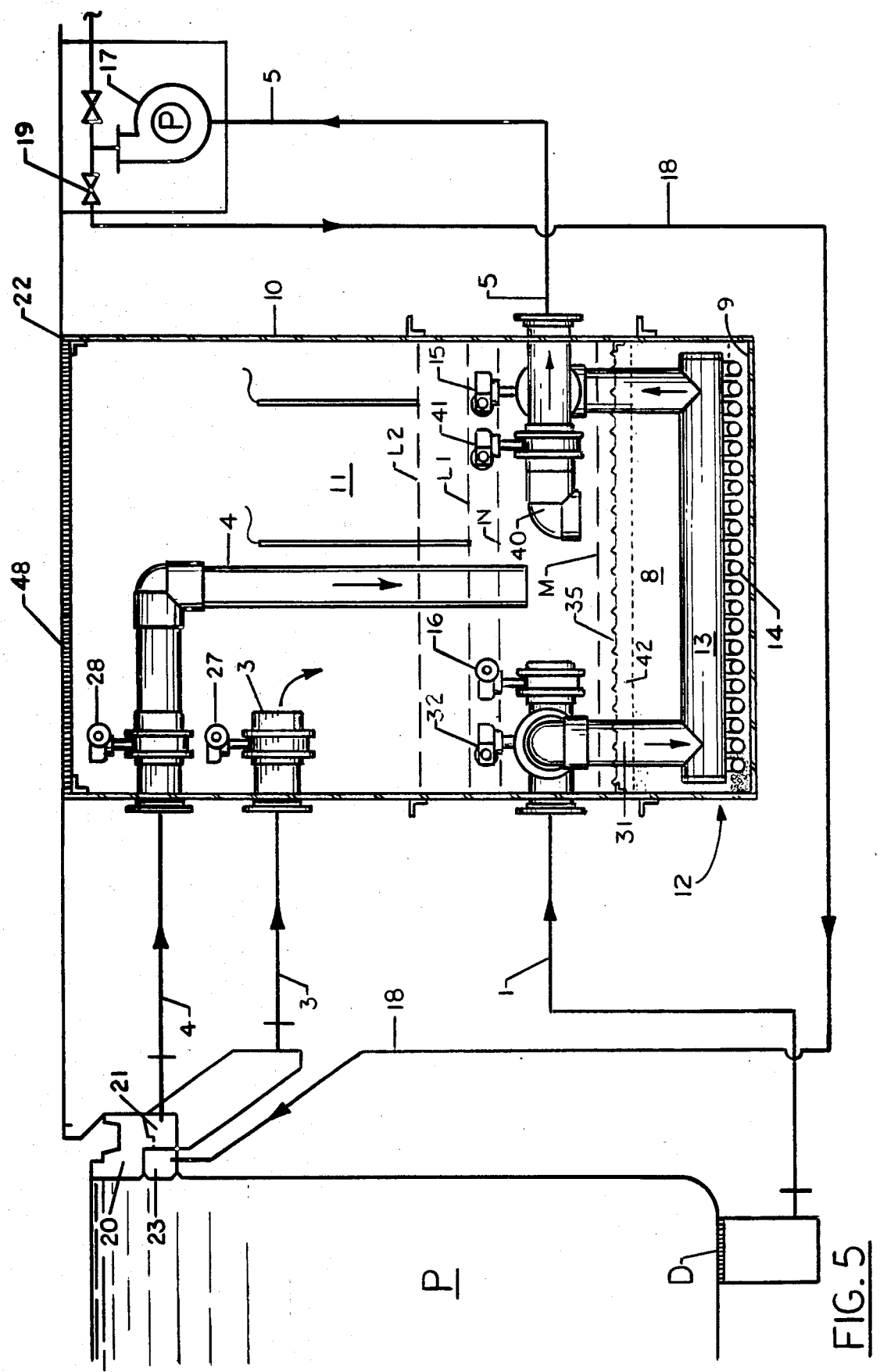
Figure 6:
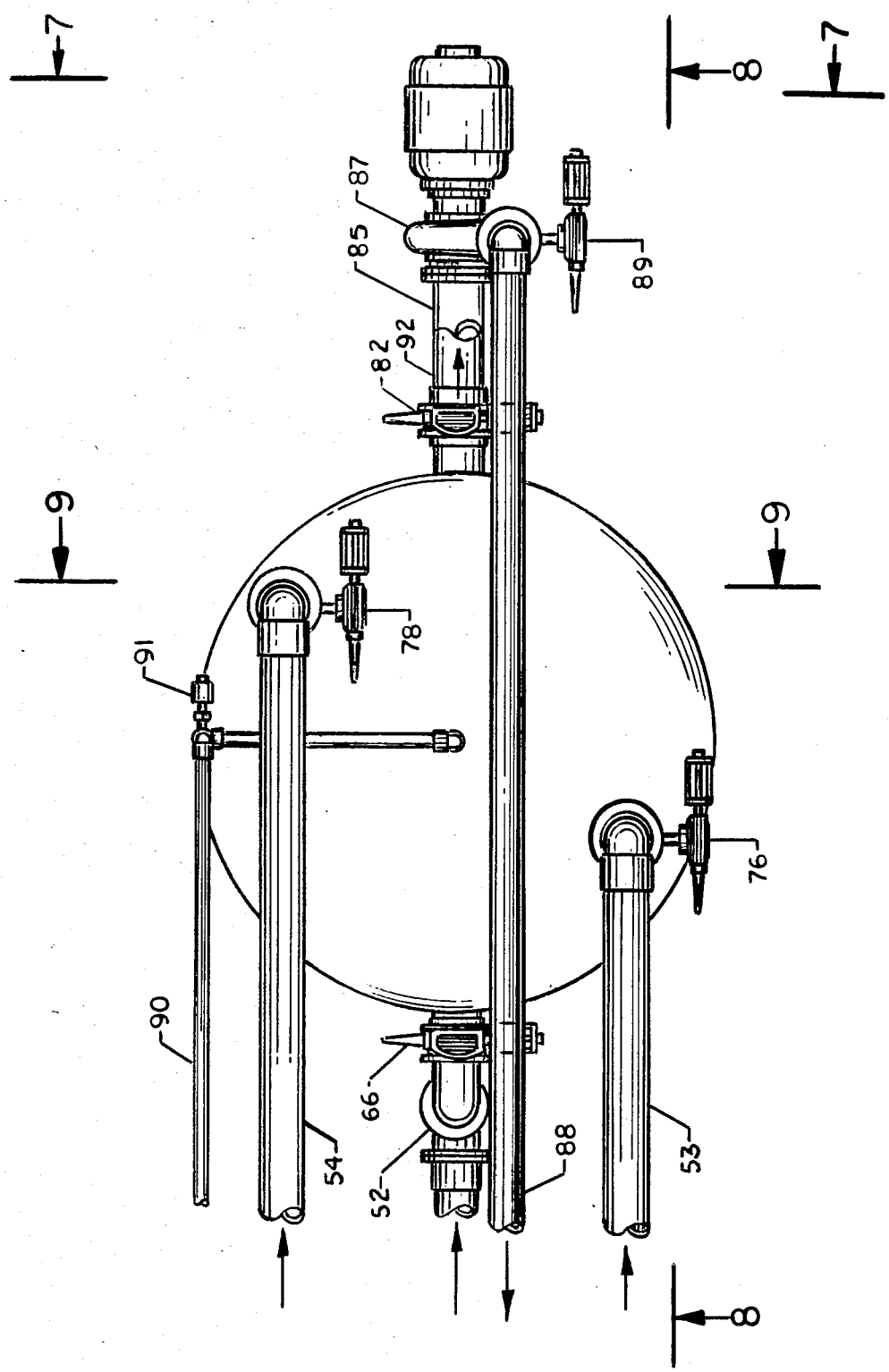
Figure 7:
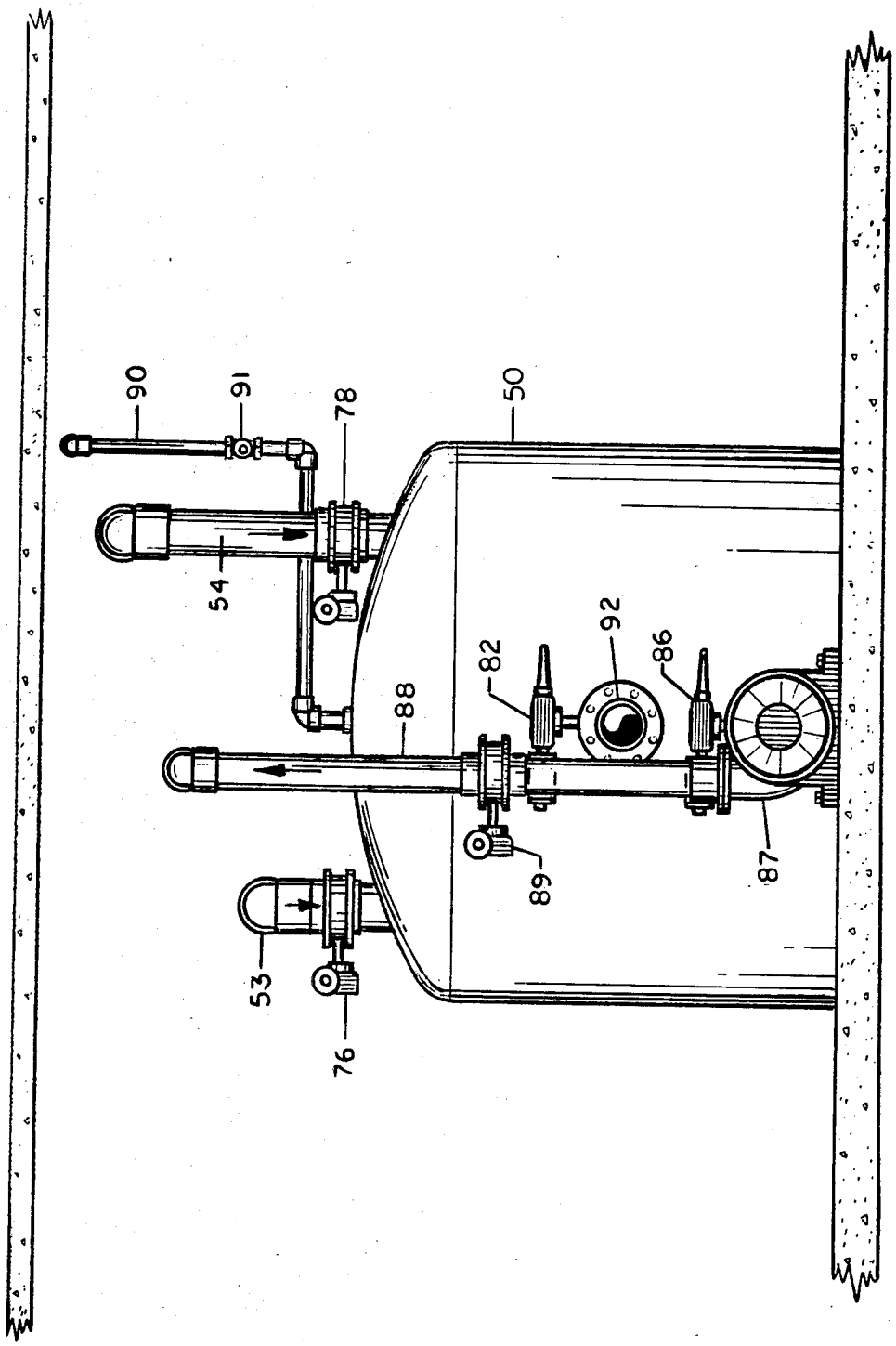
Figure 8:
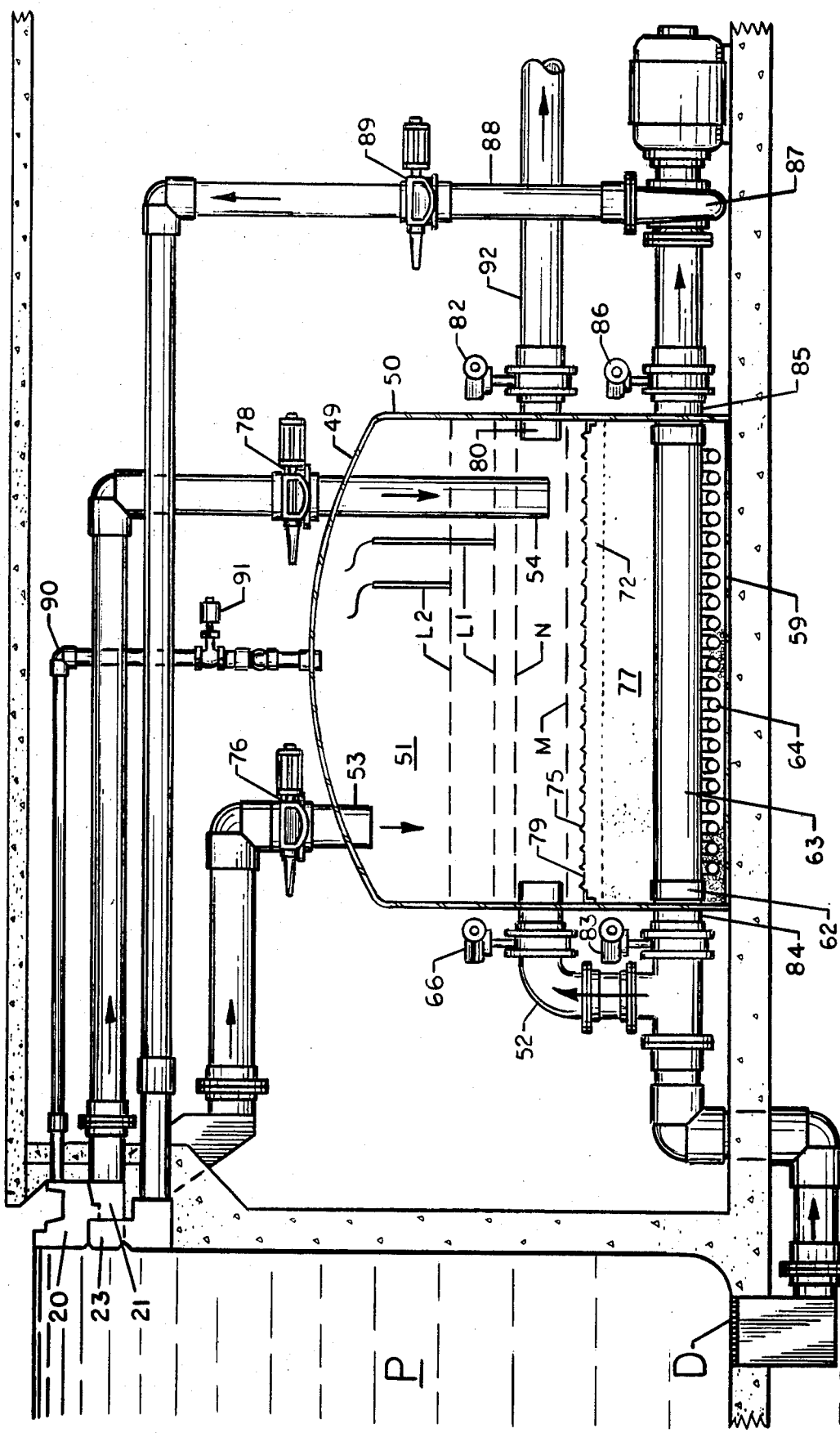
Figure 9:
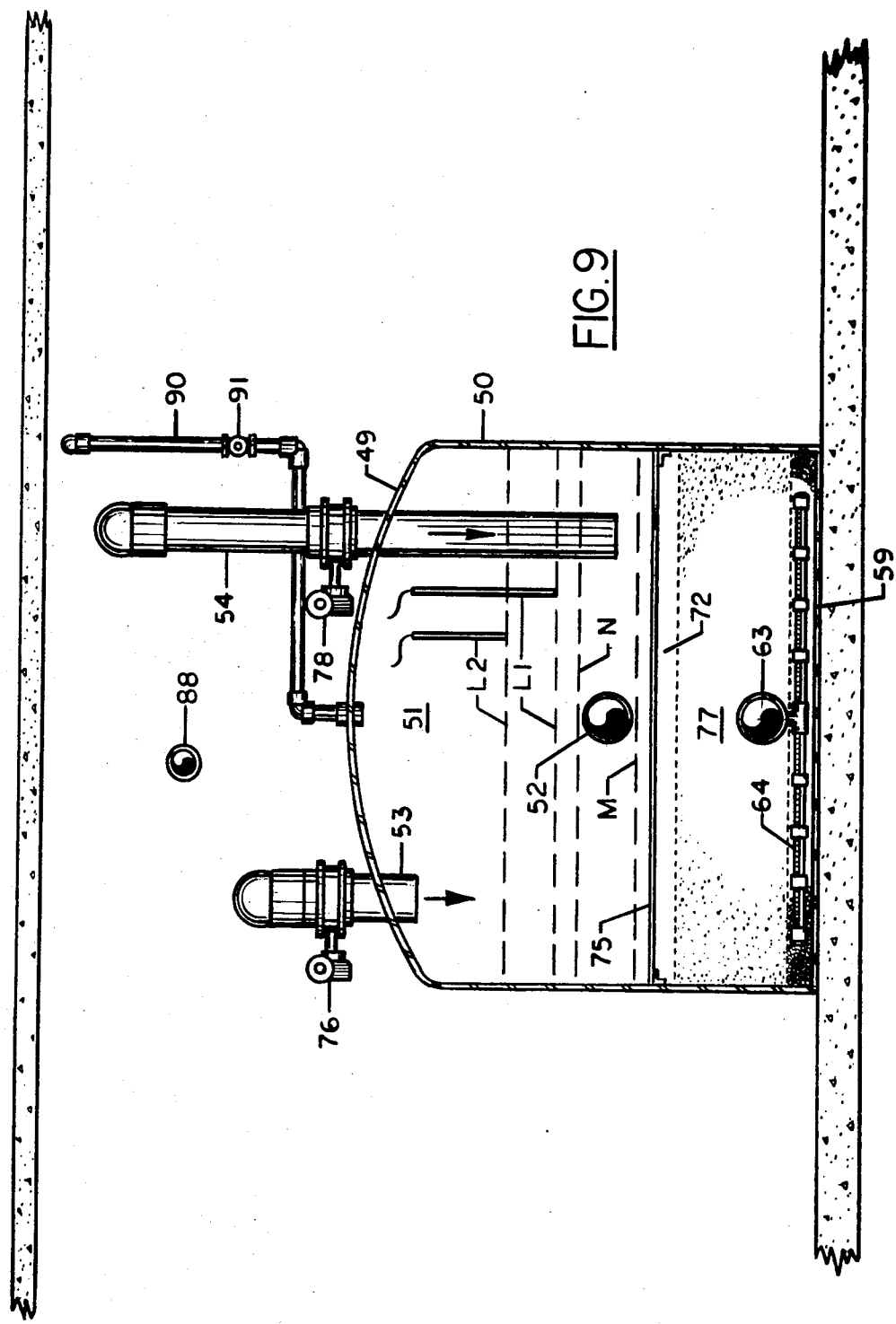

FIG. 3 reprsents a longitudinal sectional view taken along the line 3,3 of FIG. 1;

FIG. 4 represents a cross-sectional view taken along the line 4,4 of FIG. 1;

FIG. 5 is a schematic view showing the water recirculation system of a swimming pool, with the vacuum filter of FIGS. 1 to 4 installed;

FIG. 6 represents a top or plan view of another embodiment of the vacuum filter;

FIG. 7 represents an end view of the vacuum filter of FIG. 6;

FIG. 8 represents a longitudinal sectional view taken along the line 8, 8 of FIG. 6; and FIG. 9 represents a cross-sectional view taken along the line 9,9 of FIG. 6.

The vacuum filter of FIGS. 1 to 5 has a filter tank 10 with a filter compartment 11 and with inlet line connection 1 from the main drain D of the swimming pool P with main drain control valve 16 interposed; inlet line connection 3 for gravity feed of water from the perimeter gutter system 20, and inlet line connection 4 for suction feed of water from the perimeter gutter system 20 via perimeter suction tube 21. All three inlet lines 1, 3, 4 feed into filter compartment 11 above the filter bed 8.

The filter tank 10 is designed to receive water to be filtered by gravity flow from the swimming pool P. For ease of access, the tank is beside the pool, outside the perimeter gutter 20, with the top 22 level with the ground surface. The top 22 of the tank is high enough to contain water from the pool within the tank, without overflowing, when the pool is filled. Water from the swimming pool P when the main drain control valve 16 is open flows by gravity into the filter compartment 11, and will fill the compartment 11 with water to a level corresponding to the normal operating level of the water in the swimming pool. When the filter system is in operation, the valve 16 is throttled to reduce the flow from the main drain until the water flowing through the filter is equalized at the level M (minimum operating level) with all water coming through the main drain without any flow from the perimeter overflow system. Valve 16 will normally be open (or partially open) when the filter is onstream and valve 16 is closed when the filter is being cleaned by backwashing as will presently be seen. If repairs to the tank are needed, or the filter bed is to be replaced, then the valve 16 can be closed to prevent water flowing from the pool through the main drain line 1 into the filter compartment 11.

Connected to the main drain line 1 before the main drain control valve 16 is line 31 which is in flow connection via valve 32 with the filter underdrain manifold 12 composed of a header line 13, extending across the compartment, with lateral feeder pipes 14 extending at right angles therefrom on a four-inch spacing across the bottom 9 of the compartment 11. Water can flow in either direction through the manifold 12 and header-lateral feeder pipe system 13, 14, upwardly during backwash, for distribution of unfiltered water from the main drain 1, through valve 32 and line 31 to the bottom 9 of the compartment 11, or downwardly during filtration for collection of filtered water from the bottom 9 of the compartment 11.

At its outlet end, the manifold 12 and header system 13, 14 are in flow communication via line 5 and valve 15 to the water recirculation pump 17. In normal onstream operation, the water at the bottom of the compartment will be clean, having passed through filter bed 8, and passes via laterals 14 and suction header 13 through line 5 and valve 15 which is open when the filter is on-stream through the recirculating pump 17 and is then returned to the swimming pool via return line 18 and filter return valve 19 to the clean water feed conduit 23, at the pool perimeter beside the gutter 20.

It will be noted that inlet line 3 from the gutter 20 feeds waters in the upper portion of the compartment 11, at a level well above the level N and the lines 1 and 4 from the pool P and suction tube 21 of the gutter. The line 3 can be closed off by the Dezurik valve 27, and line 4 can be closed off by another Dezurik valve 28. At its outlet end in the compartment 11, the line 3 is at a level low enough for water to flow by gravity from the gutter system 20 through the line 3 into the compartment 11, in a manner similar to the gravity flow from the swimming pool P via the main drain D and line 1 into compartment 11.

Extending horizontally all the way across the compartment 11 below line 1 above the top of the particulate filter bed 8 is a stainless steel equalization screen 35, serving as a flow distribution plate. The bed 8 is of sand, having a particle size not less than 0.45 mm and not exceeding 0.55 mm, but other particulate filter materials can be used, in single or multilayers, including for example charcoal and gravel of the same or various particle sizes. It is frequently desirable to arrange the bed in layers, with the layer of the largest or coarsest particles on the bottom, and the layer of the finest particles towards the top, to provide a continually increasing pore size in the bed in the direction of fluid flow, for more efficient filtration, and also to facilitate cleaning the bed by backwashing. It will be seen that the particulate filter bed 8 completely surrounds and embeds the header and manifold system 12, 13, 14 at the bottom 9 of the compartment 11.

The operation of the recirculation pump 17 withdraws water from the bottom 9 of compartment 11 via the manifold system 12, 13, 14 and outlet line 5. Consequently, suction is applied to the downstream face of the filter bed 8. Since the fluid pressure on the upstream side of the bed is the total of atmospheric pressure plus the static head of water pressure in the filter compartment 11, the effect of the pump suction in drawing a vacuum on the downstream side of the bed aids in inducing water to percolate uniformly through all parts of the bed.

Above the top of the stainless steel equalization screen 35 is a backwash line 40 connected via valve 41 with the recirculation pump 17, or alternatively connected via valve 43 and line 44 directly to waste. Line 40 is placed approximately 6 inches above the equalization screen, thus ensuring minimum head gradients under backwashing conditions.

The screen 35 has the function of breaking up any turbulent flow at the top of the compartment 11, due to the inrush of water through the inlet lines 1, 3, 4. The screen apertures 36 are small enough to filter any large debris that might pass into the filter compartment 11 via lines 1, 3 and 4 from the pool P or gutter system 20.

In operation, with the vacuum filter on the filtering mode, the main drain control valve 16 is open (or partially open) as also is valve 27 in line 3, while the valve 28 on line 4 is closed. On the downstream side of the filter, valve 41 (or alternately valve 43) is closed, and the valve 15 open permitting the water in the header and manifold system 12, 13, 14 to pass to the recirculating pump 17 for recirculation via line 18 back to the swimming pool.

The pump is operated, causing a vacuum in the header and manifold system 12, 13, 14. Dirty water from the main drain D of the swimming pool P enters the compartment 11 via line 1 and dirty water from the gutter system 20 enters via line 3 directly into the compartment 11. All such water passes downwardly through the sand filter bed 8, enters the header manifold system 12, 13, 14 and then passes via line 5 and valve 15 to the pump 17, and back to the pool via the filtered water return line 18.

When the minimum operating level M is established in compartment 11 by throttling main drain valve 16, this is the minimum operating level to which, at the normal recirculating rate, the level in compartment 11 can draw down to, with no water from the gutter 20 entering compartment 11 via line 3.

Under normal quiescence conditions, with approximately 50% of the water coming from the main drain 1 through valve 16 into compartment 11, and 50% of the recirculating rate coming through valve 27 via line 3 into the filter compartment 11, a somewhat higher normal operating level N is established, wherein the increase in water level caused by the inflow of approximately 50% of the recirculating rate via line 3 into the compartment 11 raises the water level to this level, and in turn applies additional head on the main drain line 1 and thereby reduces the amount of flow coming from the main drain, so that at level N approximately 50% of the recirculating rate is coming through each of the main drain line 1 and the gutter line 3.

As activity in the pool increases, due to a number of bathers entering the water, gravity gutter water flow via line 3 will increase. When the gutter flow increases, the water level in the compartment 11 rises above the normal operating level N toward a higher level, indicated as L1. As the water level rises, it reduces the effective head available to cause water to flow from the main drain line 1 into the compartment 11. This automatically reduces main drain flow into the compartment 11, and compensates for the increased gravity flow via line 3 from the gutter system 20, thus making it possible for the water recirculation system to accommodate the increased flow from the gutter system by reducing intake from the main drain.

As the pool activity increases further, the water level in the filter chamber 11 continues to rise, due to further increased gravity flow via line 3. This continues to cause further throttling back of the main drain flow, to compensate for the increased gutter flow. Eventually, the water level reaches L1, at which point the water level-responsive sensor L1 now opens the suction inlet line 4 by opening valve 28, permitting positive suction gutter flow from suction tube 21, thus accommodating the additional gutter flow resulting from increased pool activity, and further decreasing the flow entering compartment 11 from main drain 1.

Further increase in pool activity to a maximum for the pool, reflected in gutter inlet flow via lines 3 and 4, raises the water level further, to level L2. At this level, water recirculation system capacity at the normal flow rate is reached, and so the flow rate has to be increased. This is accomplished by water level-responsive sensor L2, which opens throttling valve 19, or increases the pumping rate of the pump 17, and so increases flow volume or rate. This ensures that the gutter will not flood during the period of maximum pool activity, and will still provide additional water recirculating system capacity in compartment 11 to accommodate the increased flow from the gutter system through lines 3 and 4.

When the activity in the pool decreases, the flow of water from the gutter also decreases, and the level of water in the compartment 11 consequently decreases. When it reaches and goes below L1, sensor L1 returns the water recirculation flow rate to normal. When the water level goes below L1 and reaches level N, valve 28 on line 4 closes, restoring normal operating conditions at level N, with approximately 50% of the recirculation flow coming through the main drain valve 1 and 50% through perimeter overflow line 3.

Thus, at all degrees of activity in the pool, a balance is maintained between main drain flow via line 1 entering the compartment 11 and gutter flow via lines 3 and 4 entering the compartment 11 from the gutter system. This balance is proportional to activity in the pool. At times of greater activity, water recirculation system capacity is matched to accommodate gutter flow.

From time to time, the accumulation of dirt removed by the sand bed 8 in the space 42 between the plate 35 and the top of the sand bed 8 increases differential pressure across the sand bed, and reduces effectiveness of the filter by reducing flow through the filter. In order to prevent starvation of the pump, and a diminution in water recirculation flow, it becomes necessary to clean the filter. The valves are accordingly adjusted to put the filter in the cleaning mode for backwash.

Preparation for backwash requires that the recirculation pump be turned off. Valve 15 is closed, and either backwash valve 41 to the pump suction or backwash valve 43 directly to pool gravity waste is opened, while valves 16, 27 and 28 are closed. The backwash inlet valve 32 from main drain line 1 is now opened, for backwash flow via line 31 to underdrain manifold 12, 13 and 14.

Accordingly, water entering the filter from the main drain line 1 now flows by gravity through valve 32 and line 31 into the header and manifold system 12, 13, 14, and thence percolates upwardly through the sand filter bed 8, carrying with it dirt accumulated on the surface of the sand bed, passes through the stainless steel equalization screen 35, enters the backwash drain line 40, and proceeds through valve 41 (if pumped to waste by recirculating pump 17) or through gravity drain valve 43, directly to waste. If the gravity drain to waste is not available, the pump is used to remove dirty water during the backwash cleaning cycle.

When gravity drain is used, the gravity head from the swimming pool P provides the backwash flow through the filter bed, as it does during filtering, except that flow is in the reverse direction, thus ensuring laminar flow, and uniform complete cleansing and backwashing of all parts of the filter bed 8.

After the filter bed has been cleaned, the filter can be put back on-stream in the filter mode. The backwash transfer valve 32 is closed, the backwash drain valves 41 and/or 43 are closed, and the pool inlet valve 16 and gutter valve 27 are opened, as is the main pump suction valve 15. Water can then enter the filter compartment 11 above the screen 35. The recirculation pump 17 is restarted, and the filter is again on-stream in the filter mode.

The vacuum drawn on the filtered water in the header and manifold system 12, 13, 14 and downstream thereof will aid in removing dissolved gases in the dirty water. The gases will accumulate in the bottom portion of the filter bed 8. To vent them, the following system can be used. From time to time, a time clock controlling the recirculation pump 17 can automatically stop the pump for a brief period, so that the bubbles of gas collected in the bed can migrate upwardly into compartment 11. They can do so because they no longer have to fight a flow of water through the bed in the opposite direction. After passing through the bed, they can escape to atmosphere via the grating 48 at the open top of the tank.

The embodiment shown in FIGS. 6 to 9 is similar to that of FIGS. 1 to 4, with the exception that the vacuum filter is below ground level, and consequently has a closed top 49 instead of a top grating 48, as shown on FIGS. 1 to 4.

The vacuum filter of FIGS. 6 to 9 has a filter tank 50 with a filter compartment 51 and with inlet line connections 52 from the main drain D of the swimming pool P with main drain control valve 66 interposed; inlet line connection 53 for gravity feed of water from the perimeter gutter system 20, and inlet line connection 54 for suction feed of water from the perimeter gutter system 20 via perimeter suction tube 21. All three inlet lines 52, 53, 54 feed into the filter compartment 51, above the filter bed 77.

The filter tank 50 is designed to receive water to be filtered by gravity flow from the swimming pool P. The tank is below ground beside the pool, outside the perimeter gutter 20, in a buried filter pit or filter room. Water from the swimming pool P flows by gravity into compartment 51 of filter tank 50 when the main drain control valve 66 is open, and will fill the compartment 51 with water to a level corresponding to the normal operating level of the water in the swimming pool. When the filter system is in operation, the valve 66 is throttled to reduce the flow from the main drain until the water flowing through the filter is equalized at the level M (minimum operating level) with all water coming through the filter without any flow from the perimeter overflow system line 53. Valve 66 will normally be open (or partially open) when the filter is on-stream, and closed when the filter is being cleaned by backwashing, as will presently be seen. If repairs to the tank are needed or filter bed is to be replaced, then the valve 66 can be closed, to prevent water flowing from the pool P through the main drain line 52 into the filter compartment 51.

Connecting to the main drain line 52 before the main drain control valve 66 is line 84, which is in flow connection via valve 83 with the filter underdrain manifold 62, composed of a header line 63 extending across the compartment, with lateral feeder pipes 64 extending at right angles therefrom in a four-inch spacing across the bottom 59 of the compartment 51. Water can flow in either direction through the manifold 62 and the header-lateral feeder pipe system 63, 64, upwardly during backwash for distribution of unfiltered water from the main drain 52 through valve 83 and line 84 to the bottom 59 of the compartment 51, or downwardly during filtration for collection of filtered water from the bottom 59 of the compartment 51.

At its outlet end, the manifold 62 and the header system 63, 64 are in flow communication via line 85 and valve 86 to the water recirculation pump 87. In normal on-stream operation, the water at the bottom 59 of the compartment 51 will be clean, having passed through filter bed 77, and passes via laterals 64 and suction header 63 through line 85 and valve 86, which is open when the filter is on-stream, through the recirculation pump 87, and then is returned to the swimming pool via return line 88 and filter return valve 89 to the clean water feed conduit 23, at the pool perimeter beside the gutter 20.

It will be noted that inlet line 53 from the gutter 20 feeds water into the upper portion of the compartment 51 at a level well above the level N, and lines 52 from the pool P and the end of line 54 from the suction tube 21 of the gutter. The line 53 can be closed off by the Dezurik valve 76, and the line 54 can be closed off by another Dezurik valve 78. At its outlet end in the compartment 51, the line 53 is at a level low enough for water to flow by gravity from the gutter system 20 through the line 53 into the compartment 51, in manner similar to the gravity flow from the swimming pool P via the main drain D and line 52 into compartment 51.

Extending horizontally across the compartment 51 below line 52 above the top of the particulate filter bed 77 is a stainless steel equalization screen 75, serving as flow distribution plate. The filter bed 77 in this case is of sand, having a particle size not less than 0.45 mm and not exceeding 0.55 mm, but other particulate filter material can be used, in single or multilayers, including for example, charcoal and gravel of the same or various particle sizes. It is frequently desirable to arrange the bed in layers, with the layer of the largest or coarsest particles on the bottom and the layer of the finest particles towards the top to provide a continually increasing pore size in the bed in the direction of the fluid flow for more efficient filtration, and also to facilitate cleaning the bed by backwashing. It will be seen that the particulate filter bed 77 completely surrounds and embeds the header manifold system 62, 63, 64 at the bottom 59 of the compartment 51.

The operation of the recirculation pump 87 withdraws water from the bottom 59 of compartment 51 via the manifold system 62, 63, 64 and outlet line 85. Consequently, suction is applied to the downstream face of the filter bed 77. Since the fluid pressure on the upstream side of the bed is the total of atmospheric pressure plus the static head of water pressure in the filter compartment 51, the effect of the pump suction in drawing a vacuum on the downstream side of the bed aids in inducing water to percolate uniformly through all parts of the bed.

Above the top of the stainless steel equalization screen 75 is backwash line 80 connected via valve 82 to the recirculation pump 87, or alternatively connected via valve 82 and line 92 directly to waste. Line 80 is placed approximately 6 inches above the equalization screen, thus ensuring minimum head gradient under backwashing conditions.

The screen 75 has the function of breaking up any turbulent flow at the top of the compartment 51, due to the inrush of water through the inlet lines 52, 53, 54. The screen apertures 79 are small enough to filter any large debris which might pass into the filter compartment 51 via lines 52, 53, 54 from the pool P or the gutter system 20.

In operation, with the vacuum filter in the filtering mode, the main drain control valve 66 is open (or partially open) as also is valve 76 in line 3, while the valve 78 in line 54 is closed. On the downstream side of the filter, valve 82 is closed and the valve 86 open, permitting the water in the header and manifold system 62, 63, 64 to pass to the recirculating pump 87, for recirculation via line 88 back to the swimming pool.

The pump is operated, causing a vacuum in the header and manifold system 62, 63, 64. Dirty water from the main drain D of the swimming pool P enters the compartment 51 via line 52, and dirty water from the gutter system 20 enters via line 53 directly into compartment 51. All such water passes downwardly through the sand filter bed 77, enters the header manifold system 62, 63, 64 and then passes through line 85 and valve 86 to the pump 87, and back to the pool via the filtered water return line 88.

Under normal quiescence conditions, with approximately 50% of the water coming from the main drain 52 through valve 66 into the compartment 51, and 50% of the recirculating rate coming through valve 76 via line 53 into the filter compartment 51, a somewhat higher normal operating level N is established, wherein the increase of water level caused by the inflow of approximately 50% of the recirculating rate via line 53 in the compartment 51 raises the water level to this level, and in turn applies additional head in the main drain line 52, and thereby reduces the amount of flow coming from the main drain, so that at level N approximately 50% of the recirculating rate is coming through each of the main drain line 52 in gutter line 53.

As activity in the pool increases, due to a number of bathers entering the water, gravity water flow via line 53 will increase. When the gutter flow increase, the water level in the compartment 51 rises above the normal operating level N, toward a higher level indicated as L1. As the water level rises, it reduces the effective head available to cause water to flow from the main drain 52 into the compartment 51. This automatically reduces main drain flow into the compartment 51, and compensates for the increased gravity flow via line 53 from the gutter system 20, thus making it possible for the water recirculating system to accommodate the increased flow from the gutter system by reducing intake from the main drain.

As the pool activity increases further, the water level in the filter chamber 51 continues to rise, due to further increased gravity flow via line 53. This continues to cause further throttling back of the main drain flow, to compensate for the increased gutter flow. Eventually, the water level reaches L1, at which point the water level-responsive sensor L1 now opens the suction inlet line 54 by opening valve 78, permitting positive suction gutter flow from suction tube 21, thus accommodating the additional gutter flow resulting from increased pool activity, and further increasing the flow entering compartment 51 from the main pool drain D.

Further increasing pool activity to the maximum for the pool, reflected in gutter inlet flow via lines 53 and 54, raises the water level further, to level L2. At this level, water recirculating system capacity at the normal flow rate is reached, and so the flow rate has to be increased. This is accomplished by water level-responsive sensor L2, which opens throttling valve 89, or increases the pumping rate of pump 87, and so increases flow volume or rate. This ensures that the gutter will not flood during the period of maximum pool activity, and will still provide additional water recirculation system capacity into compartment 51, to accommodate the increased flow from the gutter system through lines 53 and 54.

When the activity in the pool decreases, the flow of water from the gutter also decreases, and the level of water in the compartment 51 consequently decreases.

When it reaches and goes below level L2, the L2 sensor returns the water recirculation flow rates to normal. When the water level goes below L1 and reaches level N, valve 78 on line 54 closes, restoring normal operating conditions at level N, with approximately 50% of recirculation flow coming from the main drain valve 52, and 50% through the perimeter overflow line 53.

Thus, at all degrees of activity in the pool, the balance is maintained between the main drain flow via line 52 entering the compartment 51, and gutter flow via lines 53 and 54 entering compartment 51 from the gutter system. This balance is proportional to activity in the pool. At times of greater activity, water recirculation system capacity is matched to accommodate gutter flow.

From time to time, the accumulation of dirt removed by the sand bed 77 in the space 72 between the plate 75 and the top of the sand bend 77 increases the differential pressure across the sand bed, and reduces effectiveness of the filter by reducing flow through the filter. In order to prevent starvation of the pump, and a diminution in water recirculation flow, it becomes necessary to clean the filter. The valves are accordingly adjusted to put the filter in the cleaning mode for backwash.

Preparation for backwash requires the recirculation pump be turned off. Valve 86 is closed, and valve 82 to the pump suction or directly to pool gravity waste is opened while valves 66, 76 and 78 are closed. The backwash inlet valve 83 from the main drain line 52 is now opened, for backwash flow via line 84 to underdrain manifold 62, 63, 64.

Accordingly, water entering the filter from the main drain line 52 now flows by gravity through valve 83 and line 84 into the header and manifold system 62, 63, 64, and then percolates upwardly through the sand bed 77, carrying with it dirt accumulated on the surface of the sand bed, passes through the stainless steel equalization screen 75, enters the backwash drain line 80, and proceeds through valve 82, to be pumped to waste via recirculating pump 87, or through gravity drain line 92, directly to waste. If the gravity drain is not available, the pump is used to remove dirty water during the backwash cleaning cycle.

When a gravity drain is used, the gravity head from the swimming pool P provides the backwash flow to the filter bed, as it does during filtering, except that flow is in the reverse direction, thus ensuring laminar flow, and uniform and complete cleansing of backwashing of all parts of the filter bed 77.

After the filter bed has been cleaned, the filter can be put back on-stream in the filter mode. The backwash transfer valve 83 is closed, the backwash drain valve 82 is closed, and the pool inlet valve 66 and gutter valve 76 are opened, as is the main drain pump suction valve 86. Water can then enter the filter compartment 51 above the screen 75. The recirculation pump 87 is restarted, and the filter is again on-stream in the filter mode.

The vacuum drawn on the filtered water in the header and manifold system 62, 63, 64, and downstream thereof will aid in removing dissolved gases in the dirty water. The gases will accumulate in the bottom portion of the filter bed 77. To vent them, the following system can be used. From time to time, a time clock controlling the recirculation pump 87 can automatically stop the pump for a brief period, so that the bubbles of gas collected in the filter bed 77 can migrate upwardly in compartment 51. They can do so because they no longer have to fight a flow of water through the bed in the opposite direction. After passing through the bed, they can escape to atmosphere via the vent 90, at the top of the tank, solenoid valve 91 being open.

When using a sand bed of the particle size indicated, the vacuum filters shown in the drawings are capable of producing a filtered water effluent having a turbidity of less than 0.5 FTU (Formazen Turbidity Unit) at a flow rate of 20 gallons per square foot per minute. The particle size removal is down to less than 0.5 micron, well below the limit of human vision, which is 10 microns. Thus, the filtered effluent is of the very highest quality. Because of the very even water flow patterns through the bed, the filter is capable of producing rapid flow through the bed with high efficiency filtration at flow rates between 13 and 20 gallons per square foot per minute.

Because the filter tank is flat bottomed, can be square or rectangular in shape, and is a very simple design, the filter tank can be placed in virtually any available location at a level corresponding to the pool itself. Access around the filter tank is not required, and header room requirements are very low as there are no filter elements or filter cartridges to be removed. Thus, as shown in FIGS. 1 to 5 the filter tank can be placed in the ground beside the pool, with the top of the tank 1 at deck level with access permitted through the top cover, or as shown in FIGS. 6 to 9, a closed filter tank can be placed in a filter room. The circulating pump can be placed immediately adjacent to the filter, or can be located some distance away. Since the filter is self-cleaning under conditions corresponding to the conditions when it is on-stream in the filter mode, automatic controls can be easily and economically applied. Moreover, because of the ease of access, even coated metals can be used for the tank construction, since the open tank allows easy access for examination of the integrity of a coating, and for recoating as required.

Variations of the design shown in the Figures will be apparent to those skilled in the art.

The valves controlling flow between the pool and the filter tank and between the inlet and outlet lines can be float-controlled or actuated by an external power source; such as mechanically, electrically, pneumatically, or hydraulically.

The particulate material composing the filter bed can be composed of sand and/or rock of the same or different grades, in admixture or in several layers. The layers can for example be laid down with increasing coarseness from bottom to top within the tank. For example, the layers can comprise a topmost layer of No. 20 sand. This layer will preferably be the thickest, and can be approximately one half of the filter bed. A second layer of No. 12 sand can be placed directly below the first layer. This will be of substantially less thickness than the preceding layer. The next layer can be a layer of rock of one eight to one quarter inch in diameter. This layer will be approximately equal in thickness to the preceding layer. The bottommost and coarsest layer can be composed of one quarter to one half inch rock, and this will fill the remainder of the space in the tank.

It is also possible to employ a bed composed of a single layer of one grade of sand, as illustrated in the embodiment shown in the drawings. Materials such as charcoal, vermicultie, perlite, and other suitable filter materials can be included, alone or in admixture, and the particular thickness, position or coarseness of any given layer or of the entire bed will be selected with reference to the requirements of the system to which the filter is connected.

The influent and effluent lines and connections can be formed from available pipe and plumbing fixtures.

The tank influent and effluent line and other parts of the filter can be formed of steel, stainles steel, aluminum, copper, brass and the like, and is preferably of corrosion-resistant or corrosion-resistant-coated metals. Plastic materials also can be used, particularly polytetrafluorethylene, polypropylene, polyethylene, polystyrene, and polycarbonate resins, either entirely or as coatings.

Above and below the bed there can be arranged screens or mesh filters or other apertured retainers which support the particulate material of the bed, and prevent migration of the particles downstream under either normal or reverse flow. These screens can be held in the tank supports, so as to be kept away from the sides and bottom of the tank.

Flat filter meshes and screens can also be used, alone or in combination with other supports, interposed among and between the various layers of the filter bed, to provide added filtration and layer separation. A relatively coarse screen which is adapted to be readily removed or easily reached for cleaning can be provided above the topmost layer, to remove gross-size contaminants such as leaves, twigs, bugs and the like, which may enter the filter through the water recirculating system from either the pool or the gutter. Fibrous filter media are also suitable.

The drawings show open and closed tanks. A closed tank can be formed with a removable lid, or in sectional portions which can readily be separated for cleaning. The juncture of the lid or sections of a tank can be formed by providing gasketed mating flanges on each of the two mating sections, or the lid or the tank body. Such flanges can be clamped together in a relatively fluid tight gasketed seal quite easily, and means for clamping the flanges together are well known. The preferred arrangement however is to form the tank as a single unit providing manhole access through the top head.

The manifold and header water distribution system shown in the drawings is a preferred embodiment, but other arrangements can also be employed, arranged to distribute the water relatively uniformly throughout the volume of the filter. While the drawings, FIGS. 1 to 5, show a rectangular shape for the filter tank, the filter tank can also be cylindrical, as shown in FIGS. 6 to 9, in which event the distributor can take the form of a spoked wheel, having a plurality of apertures distributed over its surfaces. The distributors can be disposed on arms from a central hub, and communicate with the manifold as the hub. Other configurations and dispositions of the distributor are possible, including a star configuration, a hollow disc configuration, and the like. In all cases, the member extending from the manifold will have a plurality of apertures distributed over their surface, for the passage of water therethrough.

The water-level-sensing water recirculation control system operating from the level of water in the vacuum filter tank, to control at least one of the surge weir and rim skimming flow and/or water recirculation flow between the pool and the gutter, and optionally, in addition, water feed from a water make-up supply, accommodates any increase in pool activity above the quiescent condition that results in a greater-than-normal skimming flow through the surge weirs and/or over the rim into the skimming gutter and that in turn causes the pool water flow volume in the gutter to increase.

In the event the gutter system includes one or more surge weirs, arranged in weir passages, an overflow sensor can be provided in the filter compartment responsive to a water level corresponding to a low activity pool condition, above the normal surge weir skimming flow level (which can be sensed in the pool by a pool sensor). When the pool overflow level reaches the level of this overflow sensor, the sensor actuates a mechanism closing off the surge weirs, arresting skimming flow through the weirs, and retaining the water in the pool, but allowing skimming flow and/or flow surges to proceed across the top rim of the pool perimeter into the gutter.

A further increase in pool activity to a higher level corresponding to moderate pool activity will increase the water level in the filter compartment. If a two-gutter system is provided, the water level in the first gutter will eventually reach the flooding level, and thus on overflow connection is provided between the first and second gutters, so that such water instead of flooding the first gutter and returning to the pool, flows from the first gutter to the second gutter.

In the event provision is made to increase or decrease water recirculation flow according to pool activity, a response is provided when pool activity is moderate.

Under moderate pool activity, there is more water overflow, and this overflow taxes the normal water recirculation system, which receives flow not only from the gutter but also from the main drain in the pool. Consequently the water level in the filter compartment rises, until it encounters a sensor at a predetermined overflow water level, a sensor which controls the position of a recirculating flow throttling control valve on the return line of the recirculation system. This valve can at normal quiescent or light pool activity provide a normal recirculation flow, but upon demand, at moderate or heavy pool activity, the valve can be actuated by the second sensor to provide a higher recirculation flow. The throttling valve thus makes it possible to design the recirculation system to accommodate any excess gutter flow above the normal recirculation rate, as may be required according to the amount of pool activity to be expected, or the amount of skimming flow through any weirs and/or across the top of the perimeter rim.

Alternatively, or in addition, this sensor can be put in operating connection with the main drain valve, and when this water level is reached, the water recirculation system capacity for gutter flow can be increased by closing off the main drive valve, causing all recirculation water between the pool and the pool recirculation system to flow into the system from the gutter.

If the throttling control valve were not opened, or if the main drain from the recirculating flow were not cut off, the recirculation system would be unable to accommodate the increased overflow, and the overflow would begin to back up in the gutter system. Consequently, this sensor prevents flooding of the gutters and back-wash to the pool under the increased overflow, as a result of this higher level of activity.

Upon a further increase in pool activity, to the maximum, i.e., operation of the pool at the rim level, providing skimming flow across the top of the gutter, the amount of overflow into the gutter increases still further. Eventually, such activity raises the overflow water level such as in the gutter to an overflow water level at which the capacity of the recirculation system is again exceeded, and must be increased further, to prevent gutter flooding and wash-back. At this point an overflow sensor is actuated which further increases recirculating flow, either by opening the recirculating flow throttling control valve on the return line of the recirculation system, to increase the amount of water drawn through the filter, and/or by closing the main drain valve (if not closed previously) and/or by opening a bypass line to bypass the filter, so as to permit the recirculation system to accommodate the excess overflow generated under such conditions.

An optional feature is control of normal pool water level. For this purpose two sensors are provided. An overflow sensor senses a level of water in the overflow, such as in the gutter or balance tank or vacuum filter tank, corresponding to a predetermined below-normal skimming flow, and when this level is reached, opens a make-up valve controlling feed of fresh water from a supply or the water main. A pool sensor senses the level of the water in the pool, and is arranged to close the make-up water valve whenever the pool water level reaches a predetermined normal quiescent level at which skimming flow via surge weirs or a skimming gutter proceeds, and overflows into the gutter. This equilibrium condition continues while skimming flow remains at a rate corresponding to a quiescent pool condition.

The several sensors can be double-acting, i.e. actuated at their predetermined water level, whether that level is reached by a declining flow or by a raising flow, or single-acting, in which case one set of sensors responds to rising level and a second set of sensors can be used if desired responding to declining flow, or a combination of both. Consequently, a declining flow can be made to reverse the sequence of actuation response noted above.

Accordingly, the control system in accordance with the invention makes it possible automatically to accommodate any amount of pool activity without gutter flooding or washing back of debris and contaminants in the gutters into the pool, permitting skimming flow through surge weirs and/or over the perimeter rim, as may be desired.

The weir or weirs for skimming flow can be skimming slots, as in U.S. Pat. Nos. 3,668,712 and 3,668,714, the slots feeding water directly into the second gutter conduit.

The vacuum filter water level sensing and control system of the invention is applicable to any design of single or multiple gutter perimeter gutter system.

U.S. Pat. No. 3,668,712 to William H. Baker dated June 13, 1972, provides a perimeter skimming gutter for swimming pools including a gutter conduit for disposition about the perimeter of a swimming pool and adapted to carry water at a level below a predetermined level of water in the swimming pool, a retaining wall on the pool-side of the conduit, over the top of which wall water may flow from the pool into the gutter conduit, and a plurality of narrow elongated substantially horizontally disposed openings through the wall at a height to maintain a predetermined water flow, the top of the wall being spaced above the openings at a height to retain the pool water within the pool perimeter at water flows, wave actions and surges up to a predetermined maximum, while allowing excessive water flows, wave actions and surges beyond such maximum to flow over the top of the wall into the gutter conduit.

U.S. Pat. No. 3,668,714 to William H. Baker dated June 13, 1972, provides a nonflooding perimeter skimming gutter for swimming pools including a first gutter conduit for disposition about the perimeter of a swimming pool, and adapted to carry water at a level below a predetermined level of water in the swimming pool, a retaining wall on the poolside of the first gutter conduit over the top of which wall a skimming flow of water may run from the pool into the first gutter conduit, a second gutter conduit adapted to carry water at a level below a predetermined level of water in the first gutter conduit, and a fluid flow connection between the two gutter conduits such level and below the top of the retaining wall allowing water flow from the first gutter conduits into the second gutter whenever the water level on the first gutter conduit reaches the fluid flow connection, thereby inhibiting filling of the first gutter conduit appreciably above such level.

Both skimming gutter designs are quite satisfactory for most sizes of swimming pool. If their unusually large gutter capacity can at times be exceeded, then the gutter of U.S. Pat. No. 3,815,160 to William H. Baker, dated June 11, 1974, can be used.

This nonflooding perimeter skimming gutter wall permits an adequate skimming action at all times, and also provides for virtually unlimited surge capacity when the pool is in use, without the possibility of the gutter's flooding, or dirt in the gutter's being washed back into the pool. This is accomplished by combining a second gutter conduit within a peripheral wall of the swimming pool, making available for gutter flow the internal volume of the wall, in fluid flow connection with the first gutter conduit, and adapted to receive water from the first gutter conduit whenever the level of water in that gutter exceeds a predetermined maximum, established at the level of the fluid flow connection therebetween. This fluid flow connection is below the top of the retaining wall, so that the water level in the first gutter conduit cannot reach the top of the retaining wall. The second gutter conduit within the wall is entirely separate from the first, and is designed to provide an ample reserve flow capacity to accommodate any heavy or surge action that may be likely to be encountered. The fluid flow connection between the gutter conduits can be arranged to skim the dirt off the top of the first gutter trough, thus assisting in preventing this dirt from being washed back into the pool.

In this gutter system, the water level in the pool is normally maintained at the level at the top of the retaining wall, which consequently serves as a skimmer gutter at the pool perimeter. The fluid flow connection may constitute a second skimming flow outlet, supplementing and continuing the skimming action of the first.

The term "conduit" as used herein is inclusive of open conduits or troughs as well as partially or wholly enclosed conduits.

In a preferred embodiment of the invention the first gutter conduit is an open trough, with at least one fluid flow connection with the second gutter conduit in the form of one of a plurality of openings at the predetermined maximum level of water in the first gutter conduit.

The second gutter conduit preferably is a closed conduit. The second gutter conduit can be within any peripheral wall of the pool. It can, for example, be within the peripheral pool-side retaining wall. It can also be within a peripheral external wall of the gutter, on the side away from the pool.

In a preferred embodiment of the invention, a water-feed conduit is provided in the gutter for feed of fresh water into the pool. This conduit is preferably an integral part of the nonflooding perimeter skimming gutter, at the pool-side retaining wall, admitting water to the pool through the pool-side retaining wall.

In the case where the two gutters are separated by a common wall, the fluid flow connection between the two gutters can be of any configuration, and is in sufficient number and at a high enough level to provide for an adequate flow capacity, to prevent the water level in the first gutter conduit from appreciably exceeding the height of the overflow connection under any water surge or wave conditions in the pool.

The level of the overflow connections with respect to the bottom of the first gutter conduit can be adjustable, so as to provide adjustment of the water level permitted in the first gutter conduit before flow via the overflow connections into the second gutter conduit commences. This adjustment can be provided for by forming the overflow connections as vertical slots or with an extended vertical height, and disposing a movable barrier member over the overflow connections with the opening or openings of the desired size and shape.

Having regard to the foregoing disclosure the following is claimed as the inventive and patentable embodiments thereof:

1. A vacuum filter for vacuum flow filtration through a filter bed of water from a swimming pool including flow from the pool and from the gutter of the swimming pool, and controlling water recirculation capacity to accommodate varying gutter flow, comprising, in combination, a tank; a filter bed of particulate material in the tank; a first inlet line communicating the swimming pool with the tank for gravity flow into the tank and maintaining a predetermined level of water in the tank in relation to a level of water in the swimming pool, thereby providing a head of water for gravity backwash flow through the filter bed; a second inlet line communicating the tank with the perimeter gutter for the swimming pool for gravity flow into the tank; a third inlet line communicating the tank with the perimeter gutter for the swimming pool for suction flow into the tank; an outlet line communicating the tank with the water recirculation system; a pump drawing a vacuum downstream of the filter bed and recirculating filtered water to the swimming pool; and at least one water level-responsive sensor sensing and directly responding to the level of water in the tank and ajusting the valve controlling suction flow, to increase gutter drain flow to the tank sufficiently to prevent gutter water flooding back from the gutter to the pool.

2. A vacuum filter according to claim 1 having valves controlling flow into the tank via the first, second and third inlet lines.

3. A vacuum filter according to claim 1, in which the valve controlling flow between the swimming pool and the tank comprises means for operating the valve including a float movable with water level in the tank between open and closed positions.

4. A vacuum filter according to claim 1, comprising a manifold and header line distribution system in the tank in fluid flow connection with the filter bed and the outlet line.

5. A vacuum filter according to claim 1, comprising an apertured flow distributor extending across and above the filter bed.

6. A vacuum filter according to claim 1, comprising a water collection trough extending across and above the filter bed, and in fluid flow communication at one end with an outlet line to outside the tank, for receiving and carrying off water from above the filter bed; and a valve controlling water flow through the outlet line.

7. A vacuum filter according to claim 1, comprising solenoid means for operating the valves between open and closed positions.

8. A vacuum filter according to claim 1, comprising water level-responding sensors for automatically operating each of the second and third valves between open and closed positions according to flow volume entering the tank.

9. An automated water cleaning and recirculation control system for swimming pools including a skimming flow perimeter gutter and a vacuum filter, comprising, in combination,
(1) a water cleaning and recirculation system receiving water from the pool, cleaning it, and returning it to the pool;
(2) a vacuum filter including a filter tank; a filter bed of particulate material in the tank; a first inlet line communicating the swimming pool with the tank for gravity flow into the tank and maintaining a predetermined level of water in the tank in relation to a level of water in the swimming pool, thereby providing a head of water for gravity backwash flow through the filter bed; a second inlet line communicating the tank with the perimeter gutter for the swimming pool for gravity flow into the tank; a third inlet line communicating the tank with the perimeter gutter for the swimming pool for suction flow into the tank; and an outlet line communicating the tank with the water recirculation system;
(3) a skimming flow perimeter gutter including a gutter conduit for disposition about the perimeter of the swimming pool, receiving overflow across a top edge thereof and adapted to carry water at a level below a predetermined level in the swimming pool; a gravity drain line in fluid flow connection with the second inlet line of the vacuum filter; a drain line for suction flow in fluid flow connection with the third inlet line of the vacuum filter, both drain lines for water feed from the gutter for cleaning; skimming means receiving skimming flow across a top edge thereof at the perimeter of the swimming pool;
(4) the water cleaning and recirculation system including a pump drawing a vacuum downstream of the filter bed and recirculating filtered water to the swimming pool; and
(5) at least one water level-responsive sensor sensing and directly responding to the level of water in the filter tank and adjusting the valve controlling suction flow, to increase gutter drain flow to the filter tank sufficiently to prevent gutter water flooding back from the gutter to the pool.

10. An automated water cleaning and recirculation control system according to claim 9 in which the vacuum filter comprises valves controlling flow from the perimeter gutter into the filter tank via the first second and third inlet lines.

11. An automated water cleaning and recirculation control system for swimming pools in accordance with claim 9, comprising a second gutter receiving skimming flow and also providing additional gutter capacity for extraordinary gutter flow, including relief flow from the first gutter in the event of considerable activity in the pool.

12. An automated water cleaning and recirculation control system for swimming pools in accordance with claim 9, wherein the skimming means comprises a closure member movable between open and closed positions; the sensor senses a predetermined water level in the filter tank at which skimming flow corresponds to a greater-than-normal skimming flow, and moves the closure into a closed position arresting skimming flow and retaining water in the pool, but allowing flow surges to proceed into the gutter.

13. An automated water cleaning and recirculation control system for swimming pools in accordance with claim 12, wherein the skimming means comprises at least one surge weir in a pool perimeter wall, and the closure closes the surge weir.

14. An automated water cleaning and recirculation control system for swimming pools in accordance with claim 9, wherein the sensor senses a predetermined water level in the filter tank at which overflow exceeds normal recirculation flow combined from the first and second inlet lines and closes the first inlet line valve so that the recirculation system receives only pool water flowing from the gutter.

15. An automated water cleaning and recirculation control system for swimming pools in accordance with claim 9, wherein the water recirculation system includes a recirculating flow throttling valve, movable between open and closed positions and controlling recirculating flow to and from the pool; and the sensor senses a predetermined water level in the filter tank at which the capacity of the recirculation system is exceeded, and adjusts the throttling valve, increasing the amount of water drawn through the recirculation system to accommodate this excess flow.

16. An automated water cleaning and recirculation control system for swimming pools in accordance with claim 9, wherein the water recirculating system includes a line bypassing the filter, and a bypass valve movable between open and closed positions, controlling flow through the bypass line; and the sensor opens the bypass valve, thereby opening the line bypassing the filter.

17. An automated water cleaning and recirculation control system for swimming pools in accordance with claim 9, comprising a recirculating flow throttling control valve on the return line of the recirculation system; a first sensor that senses a predetermined water level in the filter tank at which overflow exceeds normal recirculation flow combined from drains and closes the first inlet line valve, so that the recirculation system receives only pool water flowing from the gutter; and a second sensor that senses a predetermined water level in the filter tank at which the capacity of the recirculation system is exceeded, and adjusts the throttling valve to increase the amount of water drawn through the recirculation system, to accommodate this excess flow.

18. An automated water cleaning and recirculation control system for swimming pools in accordance with claim 9, wherein the skimming means comprises a closure member movable between open and closed positions; the water recirculation system includes a recirculating flow throttling valve, movable between open and closed positions and controlling recirculating flow to and from the pool; and comprising a first sensor that senses a predetermined water level in the filter tank at which skimming flow corresponds to a greater-than-normal skimming flow, and closes the closure, arresting skimming flow and retaining water in the pool, but allowing flow surges to proceed into the gutter; a second sensor that senses a predetermined water level in the filter tank at which flow exceeds normal recirculation flow combined from the first and second inlet lines and closes the first inlet line valve so that the recirculation system receives only pool water flowing from the gutter; and a third sensor that senses a predetermined water level in the filter tank at which the capacity of the recirculation system is exceeded, and adjusts the throttling control valve to increase the amount of water drawn through the recirculation system, to accommodate this excess flow.

19. An automated water cleaning and recirculation control system for swimming pools including a twin-gutter skimming flow perimeter gutter and vacuum filter, comprising, in combination, a water cleaning and recirculation system receiving water from the pool, cleaning it, and returning it to the pool; a vacuum filter including a filter tank; a filter bed of particulate material in the tank; a first inlet line communicating the swimming pool with the tank for gravity flow into the tank and maintaining a predetermined level of water in the tank in relation to a level of water in the swimming pool, thereby providing a head of water for gravity backwash flow through the filter bed; a second inlet line communicating the tank with the perimeter gutter for the swimming pool for gravity flow into the tank; a third inlet line communicating the tank with the perimeter gutter for the swimming pool for suction flow into the tank; and an outlet line communicating the tank with the water recirculation system; a skimming flow perimeter gutter including a first gutter conduit for disposition about the perimeter of a swimming pool, and adapted to carry water at a level below a predetermined level of water in the swimming pool; a second gutter conduit for disposition about the perimeter of a swimming pool, and adapted to carry water at a level below a predetermined level of water in the swimming pool; a retaining wall on the pool side of the gutter conduit, over the top of which wall water may flow from the pool into a gutter conduit; the top of the wall being placed at a height to maintain a predetermined water level in the pool, to provide a skimming flow of water at such predetermined water level in the pool, and to allow excessive flows, wave actions and surges to flow over the top of the wall into a gutter conduit; a gravity drain line in the first and second gutter conduits in fluid flow connection with the second inlet line of the vacuum filter; a suction flow drain line in the first and second gutter conduits in fluid flow connection with the third inlet line of the vacuum filter, both drain lines being for water feed from the gutter for cleaning; the water cleaning and recirculation system including a pump drawing a vacuum downstream of the filter bed and recirculating filtered water to the swimming pool; valves controlling flow from the perimeter gutter into the filter tank via the first, second and third inlet lines; and at least one water level-responsive sensor sensing and directly responding to the level of water in the filter tank and adjusting the valve controlling suction flow, to increase gutter drain flow to the filter tank sufficiently to prevent gutter water flooding back from the gutter to the pool.

20. An automated water cleaning and recirculation control system in accordance with claim 19, in which the first gutter conduit is an open trough.

21. An automated water cleaning and recirculation control system in accordance with claim 19, in which the fluid flow connection between the first and second gutter conduits is in the form of a plurality of slots at the predetermined maximum level of water in the first gutter conduit.

22. An automated water cleaning and recirculation control system in accordance with claim 19, in which a water-feed conduit is provided for feed of fresh water into the pool.

23. An automated water cleaning and recirculation control system in accordance with claim 22, in which the water feed conduit is disposed beside the first gutter conduit.

24. An automated water cleaning and recirculation control system in accordance with claim 22, in which the water feed conduit is disposed within the first gutter conduit.

25. An automated water cleaning and recirculation control system in accordance with claim 22, in which the water feed conduit is disposed within the second gutter conduit.

26. An automated water cleaning and recirculation control system in accordance with claim 19, in which the two gutter conduits are separated by a common wall, and the fluid flow connection between the two gutters is provided by a plurality of openings through the wall.

27. An automated water cleaning and recirculation control system in accordance with claim 19, comprising at least one jet water feed inlet in either the first or the second gutter conduit, or both, for driving water and debris along the gutter conduit.

28. An automated water cleaning and recirculation control system in accordance with claim 19, in the form of a modular wall unit adapted to be assembled end-to-end with other such units to form the perimeter gutter wall of a swimming pool.

29. An automated water cleaning and recirculation control system in accordance with claim 19, in which the second gutter is within the pool side retaining wall of the first gutter conduit.

30. An automated water cleaning and recirculation control system in accordance with claim 19, in which the second gutter is within an external peripheral wall of the first gutter conduit.

31. A swimming pool comprising side walls and a bottom adapted to retain water therewithin, and an automated water cleaning and recirculation control system according to claim 9.

32. A swimming pool in accordance with claim 31, in which the perimeter skimming gutter comprises a second gutter receiving skimming flow and also providing additional gutter capacity for extraordinary gutter flow, including relief flow from the first gutter in the event of considerable activity in the pool.

33. A swimming pool in accordance with claim 31, wherein the sensor senses a predetermined water level in the filter tank at which overflow exceeds normal recirculation flow combined from the first and second inlet lines and closes the first inlet line valve so that the recirculation system receives only pool water flowing from the gutter.

34. A swimming pool in accordance with claim 31, wherein the water recirculation system includes a recirculating flow throttling valve, movable between open and closed positions and controlling recirculating flow to and from the pool; and the sensor senses a predetermined water level in the filter tank at which the capacity of the recirculation system is exceeded, and adjusts the throttling valve, increasing the amount of water drawn through the recirculation system to accommodate this excess flow.

35. A swimming pool in accordance with claim 31, wherein the water recirculating system includes a line bypassing the filter, and a bypass valve movable between open and closed positions, controlling flow through the bypass line; and the sensor opens the bypass valve, thereby opening the line bypassing the filter.

36. A swimming pool in accordance with claim 31, comprising a recirculating flow throttling control valve on the return line of the recirculation system; a first sensor that senses a predetermined water level in the filter tank at which overflow exceeds normal recirculation flow combined from drains, and closes the first inlet line valve, so that the recirculation system receives only pool water flowing from the gutter; and a second sensor that senses a predetermined water level in the filter tank at which the capacity of the recirculation system is exceeded, and adjusts the throttling valve to increase the amount of water drawn through the recirculation system, to accommodate this excess flow.

37. A swimming pool in accordance with claim 31, comprising, in combination, a second gutter conduit for disposition about the perimeter of a swimming pool, and adapted to carry water at a level below a predetermined level of water in the swimming pool; a retaining wall on the pool side of the gutter conduit, over the top of which wall water may flow from the pool into the first gutter conduit; the top of the wall being placed at a height to maintain a predetermined water level in the pool, to provide a skimming flow of water at such predetermined water level in the pool, and to allow excessive flows, wave actions and surges to flow over the top of the wall into the first gutter conduit; and a third drain line connecting the first and second gutters with the water cleaning and recirculating system for water feed from the first and second gutter conduits, for cleaning.

38. A swimming pool in accordance with claim 37, in which the first gutter conduit is an open trough.

39. A swimming pool in accordance with claim 37, having a fluid flow connection between the first and second gutter conduits in the form of a plurality of slots at the predetermined maximum level of water in the first gutter conduit.

40. A swimming pool in accordance with claim 37, in which the two gutter conduits are separated by a common wall, and the fluid flow connection between the two gutters is provided by a plurality of openings through the wall.

41. A swimming pool in accordance with claim 37, comprising at least one jet water-feed inlet in either the first or the second gutter conduit, or both, for driving water and debris along the gutter conduit.

42. A swimming pool in accordance with claim 37, in the form of a modular wall unit adapted to be assembled end-to-end with other such units to form the perimeter gutter wall of a swimming pool.

43. A swimming pool in accordance with claim 37, in which the second gutter is within the pool side retaining wall of the first gutter conduit.

44. A swimming pool in accordance with claim 37, in which the second gutter is within an external peripheral wall of the first gutter conduit.

45. A swimming pool in accordance with claim 37, in which a water-feed conduit is provided for feed of fresh water into the pool.

46. A swimming pool in accordance with claim 45, in which the water-feed conduit is disposed beside the first gutter conduit.

47. A swimming pool in accordance with claim 45, in which the water-feed conduit is disposed within the first gutter conduit.

48. A swimming pool in accordance with claim 45, in which the water-feed conduit is disposed within the second gutter conduit.

* * * * *